(12) United States Patent
Cottingham et al.

(10) Patent No.: US 11,887,083 B2
(45) Date of Patent: *Jan. 30, 2024

(54) COMPUTER-BASED SYSTEMS CONFIGURED TO PROVIDE A PORTAL FOR MIGRATING ONE OR MORE EXISTING RELATIONSHIPS FROM ONE ENTITY TO ANOTHER ENTITY AND METHODS OF USE THEREOF

(71) Applicant: Capital One Services, LLC, McLean, VA (US)

(72) Inventors: Elias Cottingham, Brooklyn, NY (US); Thomas Dodson, Forest Hills, NY (US); Dwayne Richardson, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,393

(22) Filed: Jan. 10, 2023

(65) Prior Publication Data

US 2023/0147057 A1 May 11, 2023

Related U.S. Application Data

(63) Continuation of application No. 17/335,708, filed on Jun. 1, 2021, now Pat. No. 11,551,192, which is a (Continued)

(51) Int. Cl.
*G06Q 20/10* (2012.01)
*G06F 9/54* (2006.01)
*G06F 9/451* (2018.01)

(52) U.S. Cl.
CPC .......... *G06Q 20/108* (2013.01); *G06F 9/451* (2018.02); *G06F 9/547* (2013.01)

(58) Field of Classification Search
None
See application file for complete search history.

(56) References Cited

U.S. PATENT DOCUMENTS

| 8,458,064 B1 | 6/2013 | Dobbins |
| 9,830,648 B2 | 11/2017 | Kanjlia et al. |

(Continued)

*Primary Examiner* — Jason M. Borlinghaus
(74) *Attorney, Agent, or Firm* — Greenberg Traurig, LLP

(57) ABSTRACT

Systems and methods associated with providing an automated portal to migrate one or more relationships with one entity to another entity are disclosed. In one embodiment, an exemplary method may comprise: providing a portal enabling automated migration of existing relationships from existing entities to a first entity; generating a first UI configured for identifying and providing access information regarding existing relationships for potential migration; generating a second UI to display information regarding the existing relationships and provide UI elements enabling the user to receive migration offers; determining terms of replacement relationships that the first entity can offer the user; generating a third UI to (i) compare terms between the existing and new relationships, and (ii) enable the user to authorize the relationship migration; performing an automated generation process to create the new relationship(s); and performing an automated transfer process to transfer all objects to the new relationship.

20 Claims, 16 Drawing Sheets

Related U.S. Application Data continuation of application No. 16/654,837, filed on Oct. 16, 2019, now Pat. No. 11,023,870.

(56) References Cited

U.S. PATENT DOCUMENTS

| | | |
|---|---|---|
| 9,842,321 B2 | 12/2017 | Johnston et al. |
| 9,842,322 B2 | 12/2017 | Johnston et al. |
| 9,842,367 B2 | 12/2017 | Johnston et al. |
| 2006/0116949 A1 | 6/2006 | Wehunt et al. |
| 2014/0279410 A1* | 9/2014 | Milligan ................ G06Q 40/02 705/39 |
| 2015/0142660 A1 | 5/2015 | Johnston et al. |

* cited by examiner

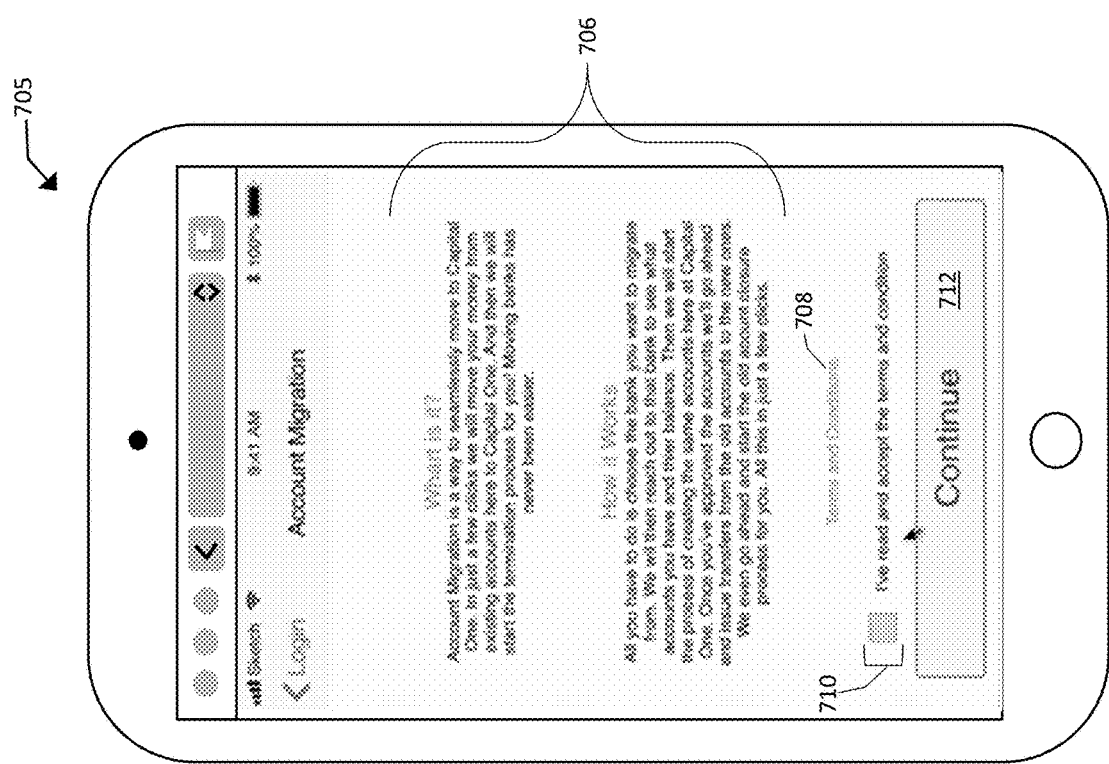
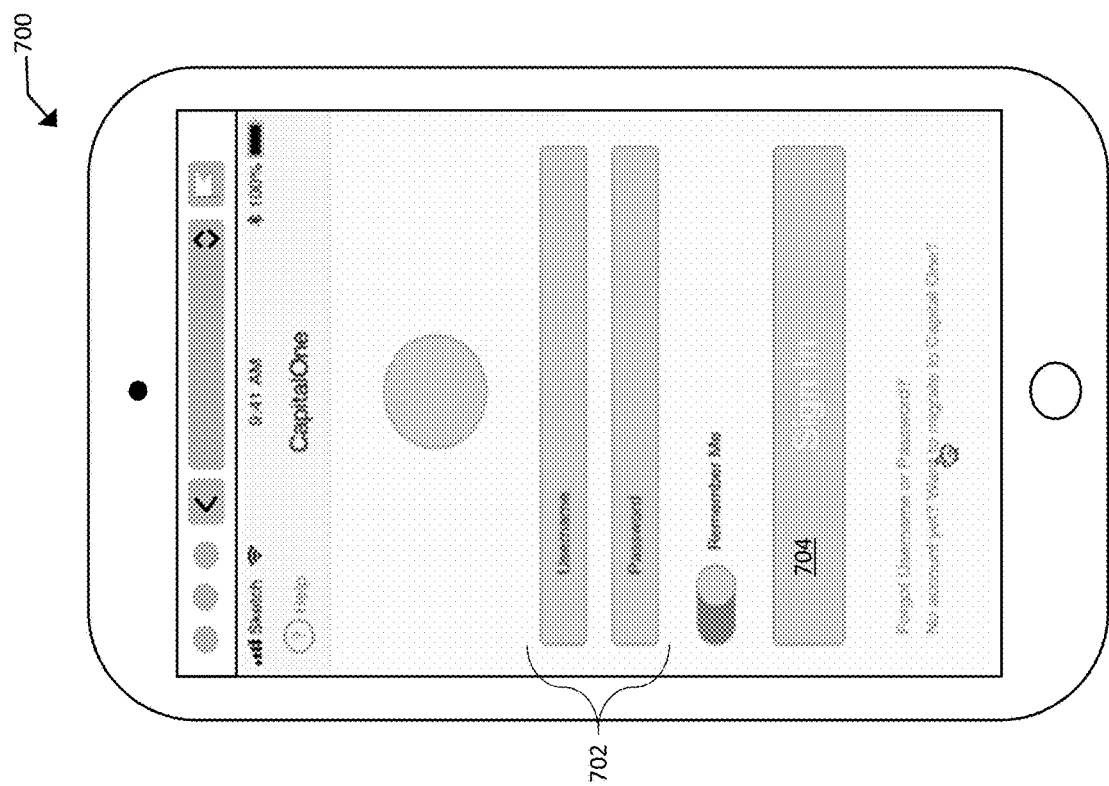
Fig 7B
Fig 7A

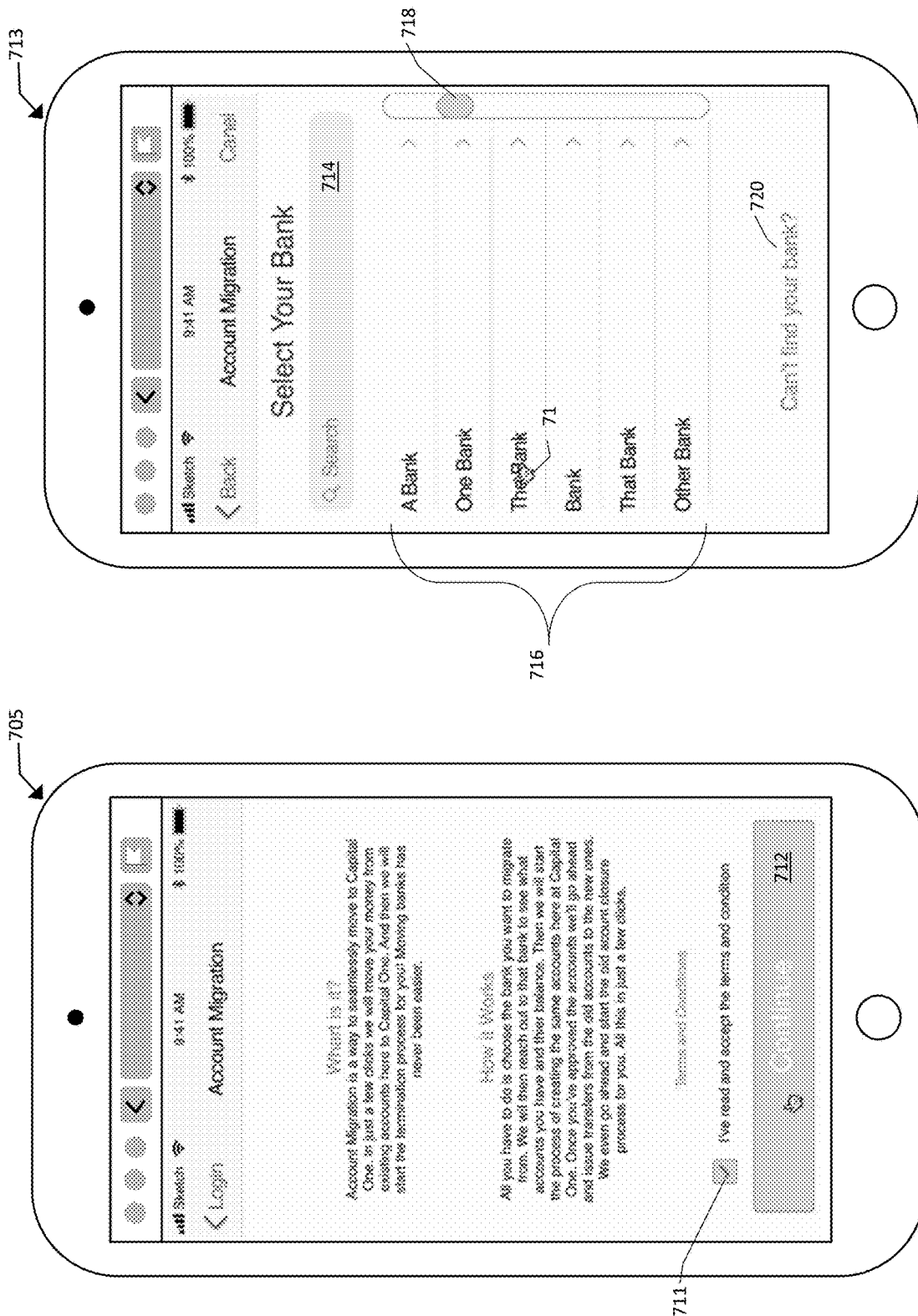

COMPUTER-BASED SYSTEMS CONFIGURED TO PROVIDE A PORTAL FOR MIGRATING ONE OR MORE EXISTING RELATIONSHIPS FROM ONE ENTITY TO ANOTHER ENTITY AND METHODS OF USE THEREOF

CROSS REFERENCE TO OTHER APPLICATIONS

This is a continuation of application Ser. No. 17/335,708, filed Jun. 1, 2021, now U.S. Pat. No. 11,551,192, which is a continuation of application Ser. No. 16/654,837, filed Oct. 16, 2019, now U.S. Pat. No. 11,023,870, the contents of all of which are incorporated herein by reference in entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to an improved computer-based platform or system, improved computing components and devices and/or improved computing methods configured for one or more novel technological applications involving a platform with portals comprising features and functionality for migrating one or more existing relationships or accounts from one entity to another entity.

BACKGROUND OF TECHNOLOGY

A computer network platform or system may include a group of computers (e.g., clients, servers, smart routers, etc.) and other computing hardware devices that are linked together through one or more communication channels to facilitate communication, relationship or account management, and/or electronic handling related to same.

SUMMARY OF DESCRIBED SUBJECT MATTER

In some embodiments, the present disclosure provides various exemplary technically improved computer-implemented methods associated with providing an automated portal to migrate one or more relationships with one entity to another entity, including methods having steps such as:
  providing, by at least one computer associated with a first entity, a portal by which a user may be provided functionality to migrate, to the first entity, one or more existing relationships that the user has with one or more second entities;
  generating, by the at least one computer, to provide to the user, a first UI configured to:
    (i) display one or more first UI elements that enable the user to specify the one or more existing relationships that the user may wish to migrate to the first entity, and
    (ii) provide one or more fields into which the user enters access information that enables direct electronic access, by the first entity, to objects representing the one or more existing relationships;
  generating, by the at least one computer, to provide to the user, a second UI configured to:
    (i) display one or more relationship types and associated relationship information regarding the one or more existing relationships that the user may wish to migrate, and
    (ii) provide one or more second UI elements configured to allow the user to select at least one element representing the one or more existing relationships with respect to which the user desires to receive offer information regarding potential migration;
  determining by the at least one computer, new relationship terms of one or more new relationships that the first entity can offer the user, the one or more new relationships corresponding to the one or more existing relationships that the user selected for the potential migration to the first entity;
  generating, by the at least one computer, to provide to the user, a third UI configured to:
    (i) display a comparison view illustrating the new relationship terms of the one or more new relationships compared against existing relationship terms of the one or more existing relationships that the user selected for potential migration, and
    (ii) provide one or more third UI elements selection of which by the user confirms that the user authorizes relationship migration to proceed for selected ones of the at least one element representing the one or more existing relationships selected for potential migration;
  upon receipt of the at least one element selected representing the one or more existing relationships, performing, by the at least one computer, an automated relationship generation process that creates the one or more new relationship authorized via user-selection of the one or more third UI elements; and
  automatically performing a transfer process, by the at least one computer accessing at least one application programming interface (API) of at least one computer platform associated with the second entities, via an external network connection, including:
    (i) generating electronic requests to transfer all objects associated with a respective existing relationship to the first entity;
    (ii) associating the transferred objects with a respective new relationship associating with the second entity; and
    (iii) confirming that the transferred objects have been transferred; and
  automatically causing, by the at least one computer, a relationship termination process of the one or more existing relationship to terminate each respective transferred existing relationship with the second entity that was successfully transferred to the first entity.

In some embodiments, the present disclosure also provides exemplary technically improved computer-based systems and computer-readable media, including media implemented with and/or involving one or more software applications, whether resident on computer devices or platforms, provided for download via a server and/or executed in connection with at least one network such as via a web application, that include or involves features, functionality, computing components and/or steps consistent with any set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 7A-7K are diagrams illustrating various exemplary user interfaces, features and functionality for performing migration of one or more relationships or accounts, consistent with exemplary aspects of certain embodiments of the present disclosure.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

Aspects of the present innovations relate to a computer-generated portal comprising user interfaces configured to migrate one or more relationships or accounts a user has with one entity to another entity are disclosed. In one embodiment, an exemplary method may comprise: providing a portal enabling automated migration of existing relationships from existing entities to a first entity; generating a first UI configured for identifying and providing access information regarding existing relationships for potential migration; generating a second UI to display information regarding the existing relationships and provide UI elements enabling the user to receive migration offers; determining terms of replacement relationships that the first entity can offer the user; generating a third UI to (i) compare terms between the existing and new relationships, and (ii) enable the user to authorize the relationship migration; performing an automated generation process to create the new relationship(s); and performing an automated transfer process to transfer all objects to the new relationship. Further, aspects of the innovations herein may involve various technical solutions required for communications between and utilization of different software applications associated with the first entity. Additional details regarding such technical solutions, including but not limited to the portal's interactions with application programming interfaces (APIs), are described herein, for example, in connection with FIG. 5 and elsewhere below.

Figure 1:
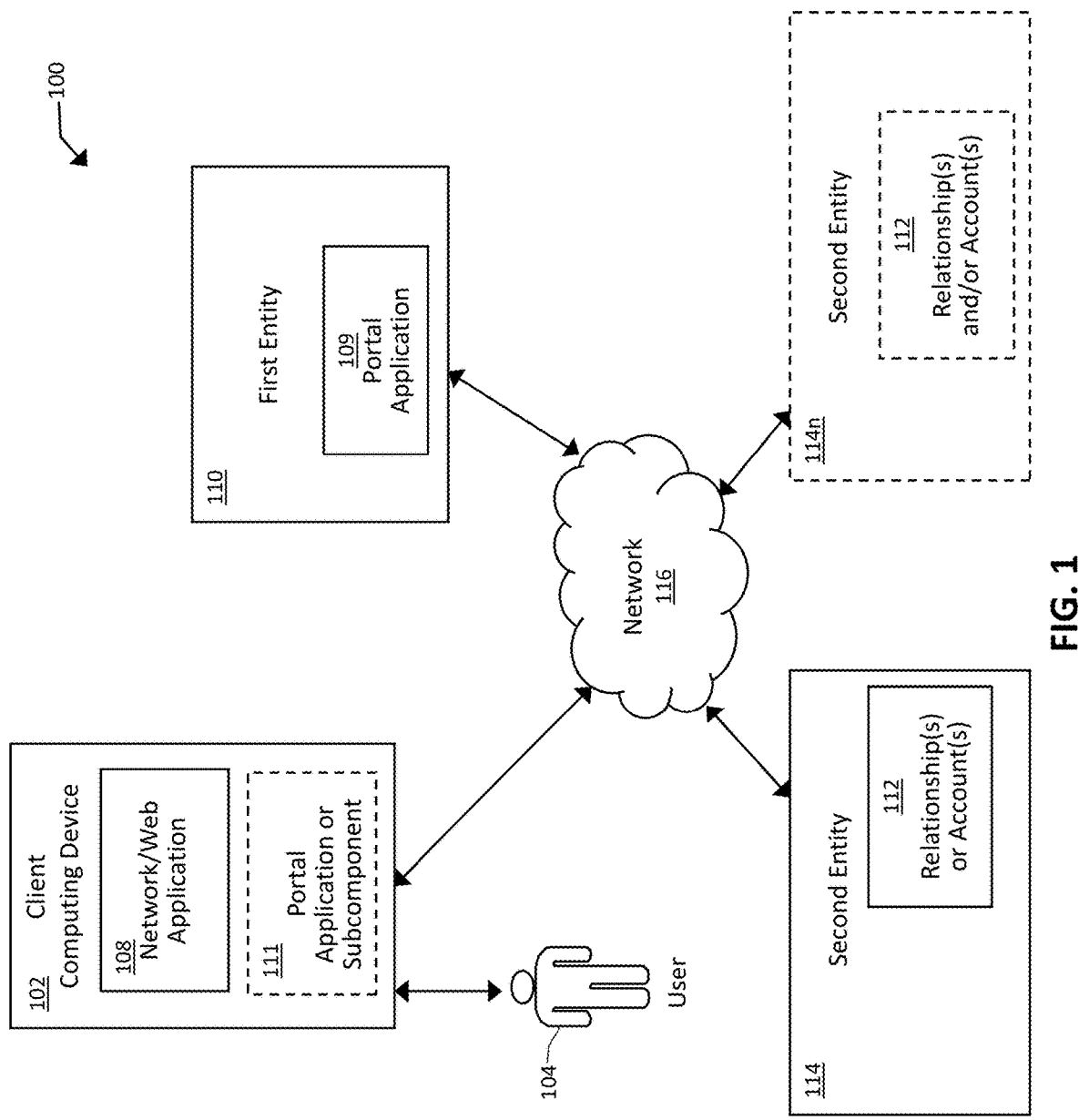
FIG. 1 is a block diagram of an exemplary system and/or platform including aspects associated with migration of relationships or accounts, consistent with exemplary aspects of certain embodiments of the present disclosure.

FIG. 1 is a block diagram of an exemplary system and/or platform 100 involving features of migrating relationships or accounts as well as generating and displaying associated user interfaces, in accordance with at least some disclosed embodiments. System 100 may be configured for executing one or more software applications, such as an application involving a portal for performing an automated migration process (hereafter "portal application") such as via an associated network/web application, consistent with disclosed embodiments. As shown, system 100 may include a computing device 102, such as a client computing device, associated with a user 104. Computing device 102 may be configured to execute, among other programs, a network/web application 108 and a portal application or portal subcomponent 111. System 100 may further include a first entity computer or system 110 such as an entity that provides a portal application 109 for performing migration herein, and one or more second entities 114 at which the user has one or more relationships or accounts 112. As shown, computing device 102, first entity 110, and second entities 114, may be communicatively coupled by a network 116. Various features, functionality and benefits of portal application 109 may also be achieved via one or more portal applications or subcomponents 111 (hereafter "modules") within or executed by the client computing device 102. For simplicity of explanation, the behavior of such software applications and/or subcomponents (i.e., 109 and 111) are generally discussed below by referring to just the "portal application."

While only one computing device 102, first entity 110, and network 116 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. Computing device 102 may be one or more computing devices configured to perform operations consistent with executing the portal application 111 and/or the network/web application 108. One illustrative computing device 102 is further described below in connection with FIG. 3.

Network/web application 108 may be one or more software applications configured to perform operations consistent with providing network or web pages to the user 104, accessing the portal (via network or online), as set forth herein, as well as interacting with the portal application 109, and the like. Here, for example, network/web application 108 may be configured to provide various user interfaces and information, associated with accessing pages related to the user's 104 activity with the portal. Such processing may occur by or with a network/web application 108, locally, or the network/web application 108 may transmit requests to and/or operate with one or more other software applications and/or computing components to process the desired information. Network/web application 108 may also be hosted and/or operated, in whole or in part, by a network/web system and/or server, described below in connection with FIG. 2. Network/web application 108 is further described below in connection with FIG. 3.

Portal application 111 may be one or more software applications, modules, routines, subroutines and/or extensions configured to perform operations consistent with accessing, using and/or providing information related to the portal application 109 provided by or in associate with the first entity 110, such as the features and functionality associated with the user interfaces shown and discussed further in connection with FIGS. 7A-7K.

First entity 110 may be an entity associated with one or more computing devices that are being operated to provide the portal application as a third-party provider (e.g., outside institution, software as a service, etc.). However, the portal application 109 may also be provided internally by an entity wishing to provide such portal to its customers or members.

Second entities 114 may each comprise one or more computing devices configured to perform operations consistent with providing relationships or accounts to the user, including features and functionality accessible by computing device 102 over network 116. For example, network or web pages of the second entities 114 may be provided at computing device 102 via the network/web application 108. The disclosed embodiments are not limited to any particular configuration of second entities 114.

In some embodiments, first entity 110 and second entities 114 may each be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art.

Network 116 may be any type of network configured to provide communication between components of system 100. For example, network 116 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
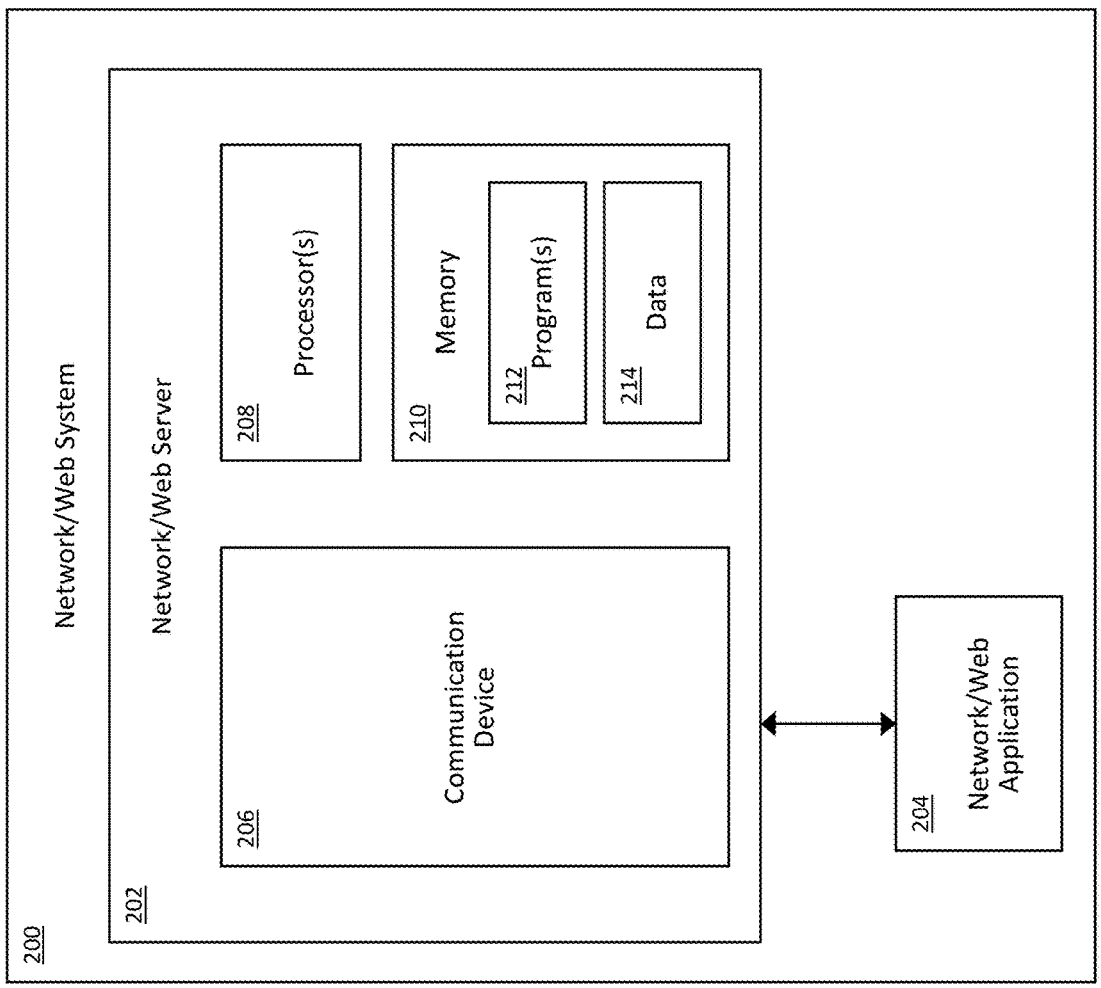
FIG. 2 is a block diagram of an exemplary system and/or platform involving features associated with migration of relationships or accounts, consistent with exemplary aspects of certain embodiments of the present disclosure.

FIG. 2 is a block diagram of an exemplary network/web system 200, in accordance with at least some disclosed embodiments. As shown, network/web system 200 may include network/web server 202 and network/web application 204. Network/web server 202 may include a communication device 206, one or more processor(s) 208, and memory 210 including one or more programs 212 and data 214. Network/web server 202 may be configured to perform operations consistent with providing a portal, user interfaces, features and functionality of the portal application 109 over one or more networks, such as an organization's intranet, the World Wide Web, etc., to the user 104.

Network/web server 202 may take the form of a server, general purpose computer, mainframe computer, or any combination of these components. Other implementations consistent with disclosed embodiments are possible as well. Network/web application 204 may take the form of one or more software applications stored on a computing device, such as network/web application 108 stored on computing device 102 described above.

Communication device 206 may be configured to communicate with one or more computing devices, such as computing device 102. In some embodiments, communication device 206 may be configured to communicate with the computing device(s) through network/web application 204. Network/web server 202 may, for example, be configured to provide instructions and/or operating information to network/web application 204 through communication device 206. Communication device 206 may be configured to communicate other information as well.

Communication device 206 may be further configured to communicate with one or more entities, including the first entity 110 and the second entities 114, described above. Communication device 206 may be configured to communicate with such entities in other manners. Communication device 206 may be configured to communicate with other components as well.

Processor(s) 208 may include one or more known processing devices, such as a microprocessor from the Core™, Pentium™ or Xeon™ family manufactured by Intel®, the Turion™ family manufactured by AMD™, the "Ax" (i.e., A6 or A8 processors) or "Sx" (i.e. S1, . . . processors) family manufactured by Apple™, or any of various processors manufactured by Sun Microsystems, for example. The disclosed embodiments are not limited to any type of processor(s) otherwise configured to meet the computing demands required of different components of network/web system 200.

Memory 210 may include one or more storage devices configured to store instructions used by processor(s) 208 to perform functions related to disclosed embodiments. For example, memory 210 may be configured with one or more software instructions, such as program(s) 212, that may perform one or more operations when executed by processor(s) 208. Such operations may include network/web activities as well as creation and/or transmission of related network/web attribute information. The disclosed embodiments are not limited to separate programs or computers configured to perform dedicated tasks. For example, memory 210 may include a single program 212 that performs the functions of network/web system 200, or program(s) 212 may comprise multiple programs. Memory 210 may also store data 214 that is used by program(s) 212.

In certain embodiments, memory 210 may store one or more sets of instructions involved with carrying out the processes described below in connection with FIGS. 4-7K. Other instructions are possible as well. In general, instructions may be executed by processor(s) 208 to perform one or more processes consistent with disclosed embodiments. In some embodiments, program(s) 212 may include one or more subcomponents configured to generate and/or process instructions and information for use by network/web application 204 in performing interactions and other activities associated with accessing the portal application 109.

The components of network/web system 200 may be implemented in hardware, software, or a combination of both hardware and software, as will be apparent to those skilled in the art. For example, although one or more components of network/web system 200 may be implemented as computer processing instructions, all or a portion of the functionality of network/web system 200 may be implemented instead in dedicated electronics hardware. In some embodiments, network/web system 200 may also be communicatively connected to one or more database(s) (not shown). Alternatively, such database(s) may be located remotely from network/web system 200. Network/web system 200 may be communicatively connected to such database(s) through a network, such as network 116 described above. Such database(s) may include one or more memory devices that store information and are accessed and/or managed through network/web system 200. By way of example, such database(s) may include Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data to the database(s).

Figure 3:
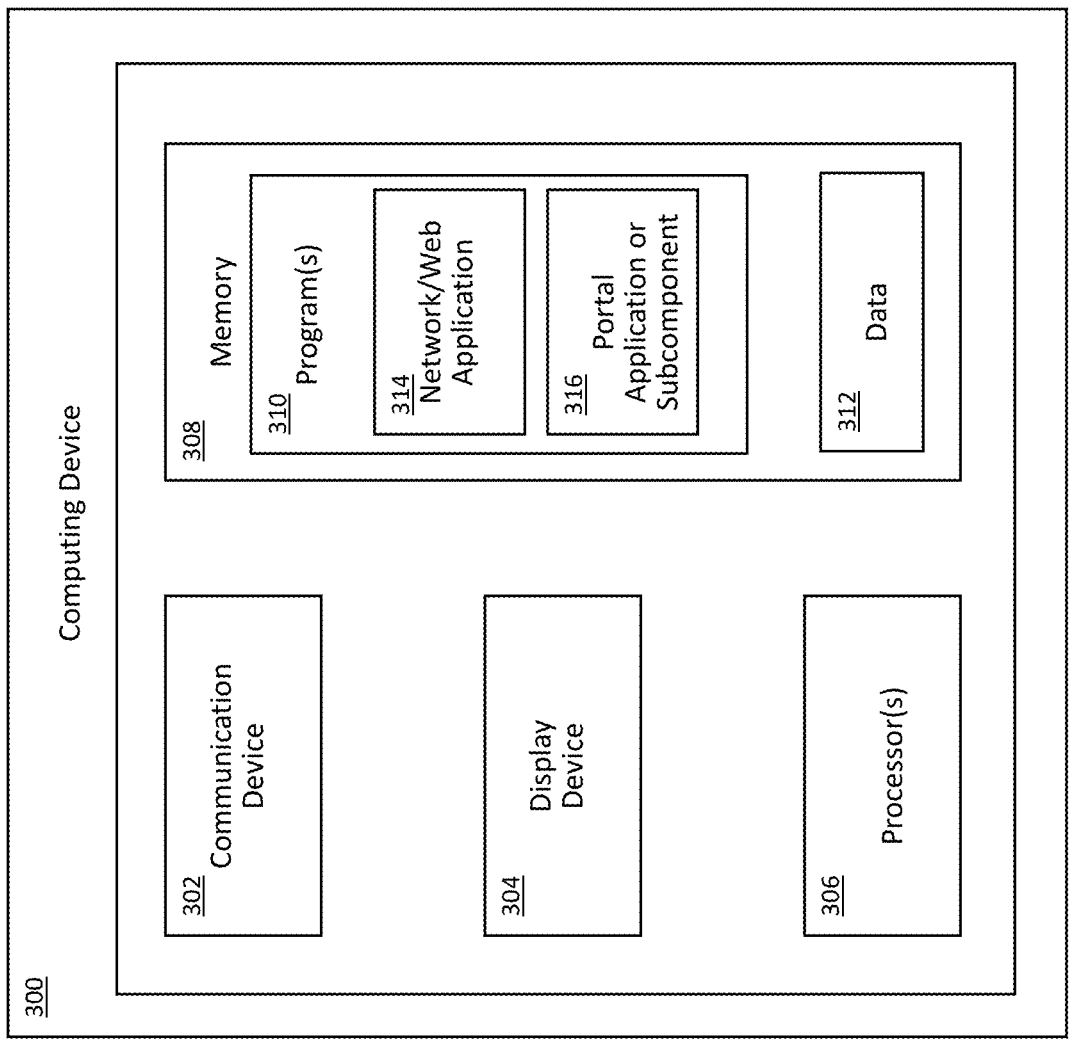
FIG. 3 is a block diagram of an exemplary computing device that may be associated with migration of relationships or accounts, consistent with exemplary aspects of certain embodiments of the present disclosure.

FIG. 3 is a block diagram of an exemplary computing device 300, consistent with disclosed embodiments. As shown, computing device 300 may include communication device 302, display device 304, processor(s) 306, and memory 308 including program(s) 310 and data 312. Program(s) 310 may include, among others, network/web application 314 and portal application or subcomponent 316. In some embodiments, computing device 300 may take the form of a desktop or mobile computing device, such as a desktop computer, laptop computer, smartphone, tablet, or any combination of these components. Alternatively, computing device 300 may be configured as any wearable item, including jewelry, smart glasses, or any other device suitable for carrying or wearing on a person. Other implementations consistent with disclosed embodiments are possible as well. Computing device 300 may, for example, be the same as or similar to computing device 102 described above.

In the example embodiment shown, communication device 302 may be configured to communicate via one or more networks with the various computer systems and servers disclosed elsewhere herein. In some embodiments, communication device 302 may be further configured to communicate with one or more entities, such as the first entity 110 and the second entities 114 described above. Communication device 302 may be configured to communicate with other components as well. Communication device 302 may be configured to provide communication over a network, such as network 116 described above. To this end, communication device 302 may include, for example, one or more digital and/or analog devices that allow computing device 300 to communicate with and/or detect other components, such as a network controller and/or wireless adaptor for communicating over the Internet. Other implementations consistent with disclosed embodiments are possible as well.

Display device 304 may be any display device configured to display interfaces on computing device 300. The interfaces may include, for example, network and/or web pages provided by computing device 300 through network/web application 108. In some embodiments, display device 304 may include a screen for displaying a graphical and/or text-based user interface, including but not limited to, liquid crystal displays (LCD), light emitting diode (LED) screens, organic light emitting diode (OLED) screens, and other known display devices. In some embodiments, display device 304 may also include one or more digital and/or analog devices that allow a user to interact with computing device 300, such as a touch-sensitive area, keyboard, buttons, or microphones. Other display devices are possible as well. The disclosed embodiments are not limited to any type of display devices otherwise configured to display interfaces.

Processor(s) 306 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor(s) 306 may also include various architectures (e.g., x86 processor, ARM®, etc.). The disclosed embodiments are not limited to any type of processor(s) otherwise configured to meet the computing demands required of different components of computing device 300.

Memory 308 may include one or more storage devices configured to store instructions used by processor(s) 306 to perform functions related to disclosed embodiments. For example, memory 308 may be configured with one or more software instructions, such as program(s) 310, that may perform one or more operations when executed by processor(s) 306. The disclosed embodiments are not limited to separate programs or computers configured to perform dedicated tasks. For example, memory 308 may include a single program 310 that performs the functions of computing device 300, or program(s) 310 may comprise multiple programs. Memory 308 may also store data 312 that is used by program(s) 310. In certain embodiments, memory 308 may store sets of instructions for carrying out some processes performed in connection with FIG. 4. Other instructions are possible as well. In general, instructions may be executed by processor(s) 306 to perform one or more processes consistent with disclosed embodiments.

In some embodiments, program(s) 310 may include a network/web application 314. Network/web application 314 may be executable by processor(s) 306 to perform operations including, for example, providing pages associated with a software application for display. Such pages may be provided, for example, via display device 304. In some embodiments, the pages may be associated with a portal being provided by an entity, such as first entity 110, second entities 114, and the like, described above. Network/web application 314 may be executable by processor(s) 306 to perform other operations as well. In some embodiments, program(s) 310 may further include a portal application or subcomponent 316. Portal application 316 may, for example, be the same as similar to portal applications 109 and/or 111, described above. In general, instructions may be executed by processor(s) 306 to perform one or more processes consistent with disclosed embodiments.

The components of computing device 300 may be implemented in hardware, software, or a combination of both hardware and software, as will be apparent to those skilled in the art. For example, although one or more components of computing device 300 may be implemented as computer processing instructions, all or a portion of the functionality of computing device 300 may be implemented instead in dedicated electronics hardware.

Figure 4:
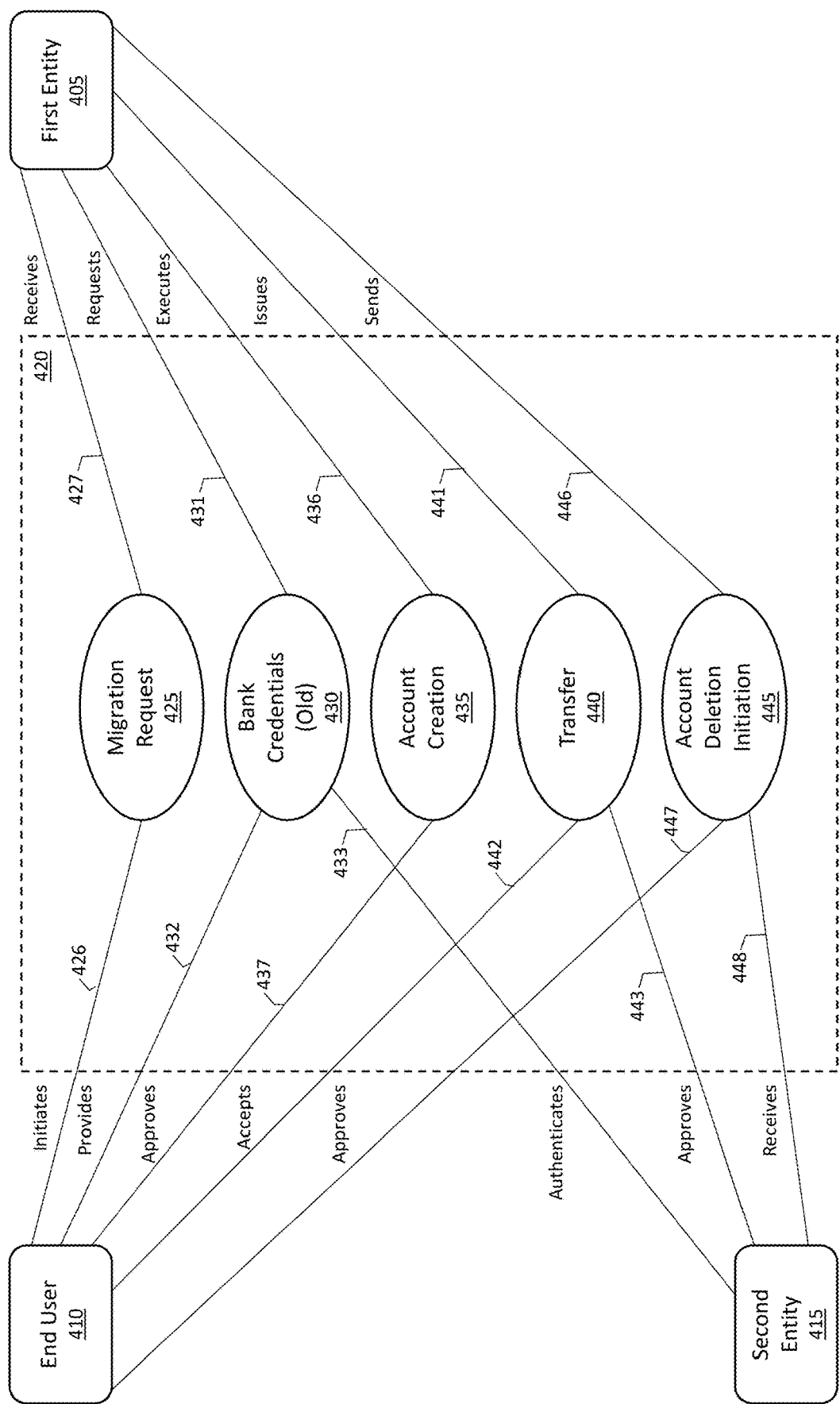
FIG. 4 is a block/flow diagram illustrating one exemplary system and related process related to performing migration of one or more relationships or accounts from one entity to another entity, consistent with exemplary aspects of certain embodiments of the present disclosure.

FIG. 4 is a block/flow diagram illustrating a representative system as well as an exemplary process for performing migration of one or more relationships or accounts from one entity to another entity, consistent with exemplary aspects of certain embodiments of the present disclosure. FIG. 4 depicts a block diagram that illustrates exemplary parties involved with the innovations herein as well as a representative series of interactions 420 among the parties. The representative parties shown in FIG. 4 include the user 410 who is considering migration of their relationships or accounts from one entity to another, the first entity 405 to which the one or more relationships or accounts of the user are being migrated, and the second entity 415 from which the relationships or accounts are being migrated. FIG. 4 also depicts an exemplary series of interactions 420 among the parties, the interactions being illustrated in connection with a migration request at 425, handling of existing bank credentials at 430, account creation at 435, transfer of relationships or accounts at 440, and initiation of account deletion at 445. In one embodiment, the series of interactions 420 of the exemplary relationship or account migrations shown in FIG. 4 may be performed via the migration portal 109 described above on connection with FIGS. 1-3.

Referring to FIG. 4, the exemplary series of interactions 420 illustrated may comprise the user initiating a migration request, at 426, with the first entity 405, after which the first entity 405 then receiving the migration request, at 427. In the embodiment illustrated, the first entity 405 then initiates a request for the existing bank credentials from the user, at 431, which the user may then provide, at 432, as described in more detail, below. Once the credentials are provided, the first entity 405 logs into the bank account of the user at the second entity, wherein the second entity 415 authenticates the login, at 433. Next, the first entity may execute an account creation process, at 436, such as by generating a new account that the first entity proposes as a replacement for the existing account. The new account and associated terms are then displayed to the user, as explained in more detail below, whereupon the user 410 next approves the new account, at 437, if the terms are acceptable. Once the new account is approved and created, the first entity 405 then initiates or issues a transfer request to transfer all existing assets at the existing account to the new account. The transfer request is then presented to the user 410, who may then accept the transfer request, at 442. Information regarding the user-approved transfer request is then provided to the second entity 415, which approves and/or facilitates the transfer of the assets to the first entity, at 443. Once the assets have been transferred, the first entity 405 then initiates an existing account deletion process, at 446, which is received and approved by the user, at 447. The second entity 448 then receives the information or instructions to delete the existing account, at 448, where the instructions may be generated by one or both of the first entity 405 and/or the user 410 (as explained in more detail, below), and then closes/deletes the existing account, which, in some embodiments, helps avoid any further charges or financial responsibilities from being incurred by the user under the old account.

Figure 5:
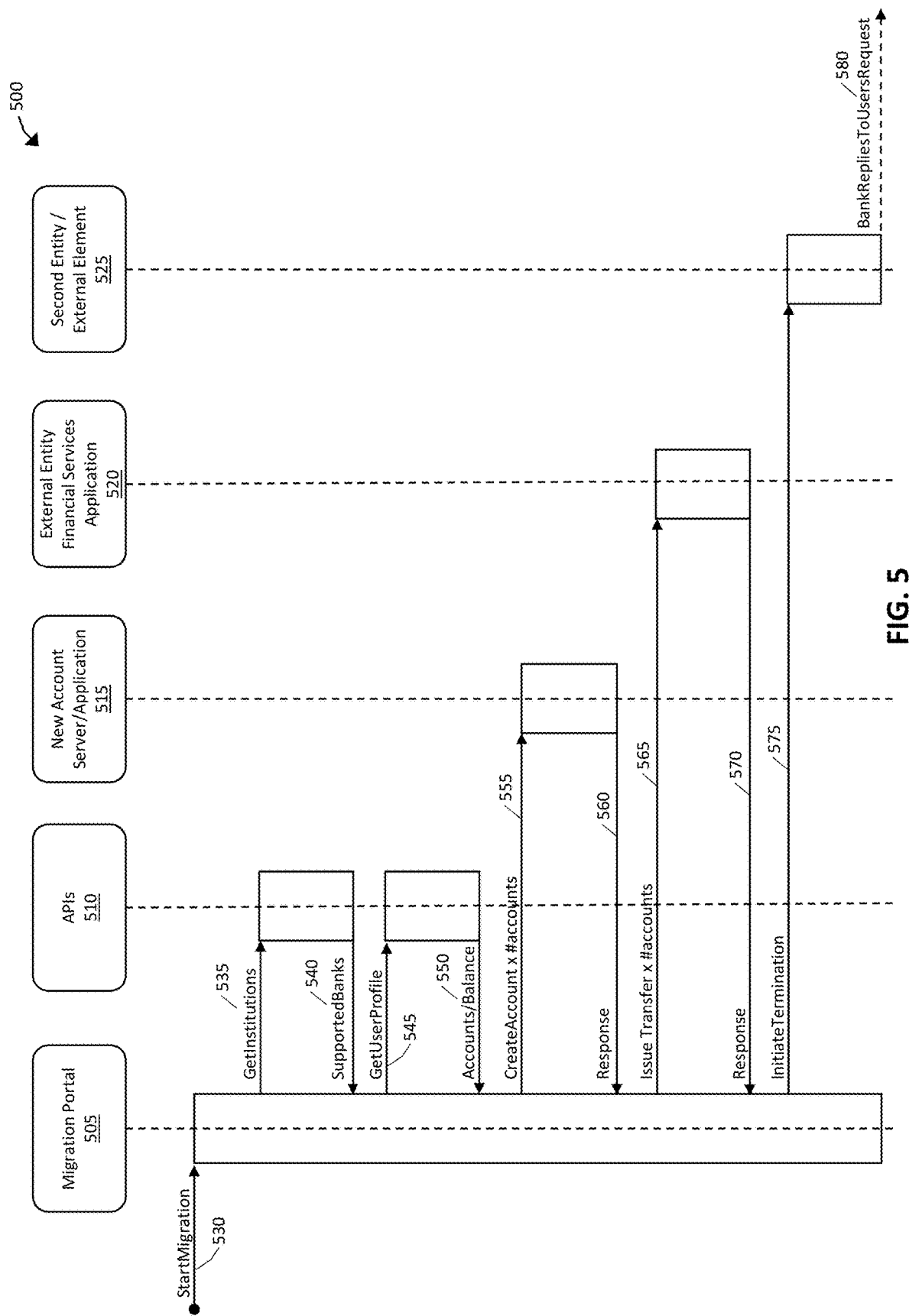
FIG. 5 is a diagram illustrating one exemplary process flow related to performing migration of one or more relationships or accounts from one entity to another entity, consistent with exemplary aspects of certain embodiments of the present disclosure.

FIG. 5 is a diagram illustrating one exemplary process flow related to performing migration of one or more relationships from one entity to another entity, consistent with exemplary aspects of certain embodiments of the present disclosure. FIG. 5 illustrates a variety of exemplary computerized applications associated with the migration innovations herein, including a migration portal 505, one or more APIs (application programming interfaces) 510 enabling communications between entities such as banks, an application and/or server associated with opening/processing new accounts ("new account application") 515, a financial services application that conducts transactions with external entities 520, and a second entity 525 such as another bank and/or other, eternal computer server, system or platform associated with a second entity separate from the first entity. Below each of these applications (505-525), FIG. 5 also illustrates an exemplary process flow associated with various relationship or account migration features herein.

Referring to FIG. 5, the process flow begins upon initiation of the migration process, at 530, where the migration portal commences the migration process by interacting with the user, as described above in connection with FIG. 4 as well as further below. Once the migration portal 505 obtains the information regarding the external, existing institutions at which the user has relationships or accounts (see, e.g., step 432 in FIG. 4), the migration portal 505 initiates, at 535, communications with one or more APIs 510 in effort to determine whether or not the third parties (second entities) of interest are available for electronic transactions with the first entity. After the first entity verifies communication with the second entities of interest, the APIs 510 will return a list of the institutions or banks for which migration is supported, at 540. Using the login credentials provided by the user, the migration portal 505 next accesses the APIs to obtain the user account and/or profile information, at 545, and returns information relevant to the migration, at 550, such as account, terms, and balance information. Once the user has approved creation of one or more new accounts to replace their existing accounts (see, e.g., step 437 in FIG. 4), the migration portal interacts, at 555, with the new account application 515 to create the new, approved accounts at the first entity corresponding to the existing accounts being replaced. The new account application 515 then responds to the migration portal 505, to confirm that the new accounts are open, at 560. Next, the migration portal initiates communication with the financial services application that conducts transactions, such as financial transactions like balance transfers, with external entities 520 and issues instructions to transfer assets, such as account balances, to the first entity. Once the assets have been transferred, the financial services application 520 responds to the migrations portal, at 570, to confirm that the transfer is complete. Next, the migration portal can initiate a termination process, at 575, to close the existing accounts in favor of the newly-created accounts. Communication to terminate the old accounts is sent to the second entity 525, such as the external bank, which will then issue a reply confirming that the accounts have been closed, at 580. While such account termination may be initiated by the migration portal, in some embodiments, the termination may also involve and/or require action taken by the user to close the accounts.

Figure 6:
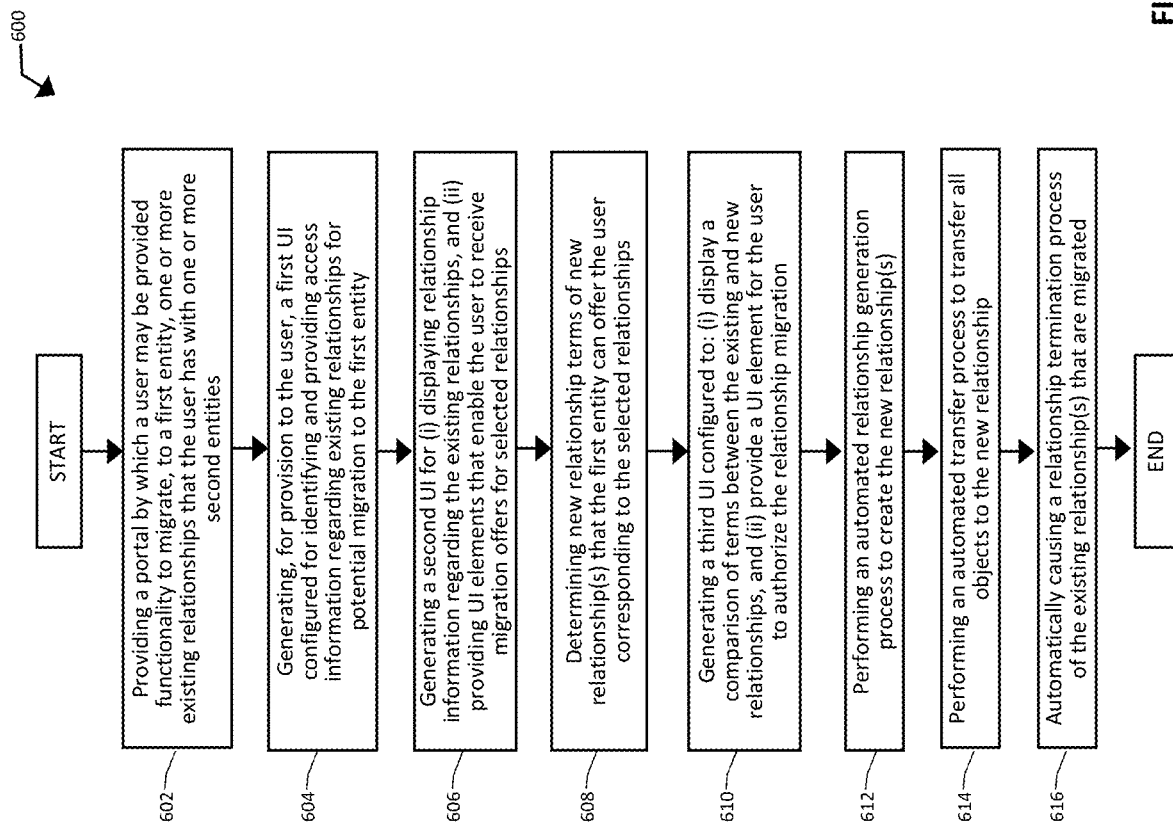
FIG. 6 is a flowchart illustrating one exemplary process related to providing a portal that performs migration of one or more relationships or accounts, consistent with exemplary aspects of certain embodiments of the present disclosure.

FIG. 6 is a flowchart illustrating one exemplary process related to providing a portal that performs migration of one or more relationships or accounts, consistent with exemplary aspects of certain embodiments of the present disclosure. Referring to the exemplary embodiment of FIG. 6, an illustrative migration method 600 for migrating one or more existing relationships or accounts from an existing entity to a new entity may comprise: providing a portal by which a user may be provided functionality to migrate, to a first entity, one or more existing relationships that the user has with one or more second entities 602; generating, for provision to the user, a first UI configured for identifying and providing access information regarding existing relationships for potential migration to the first entity 604; generating a second UI for (i) displaying relationship information regarding the existing relationships, and (ii) providing UI elements that enable the user to receive migration offers for selected relationships 606; determining new relationship terms of new relationship(s) that the first entity can offer the user corresponding to the selected relationships 608; generating a third UI configured to: (i) display a comparison of terms between the existing and new relationships, and (ii) provide a UI element for the user to authorize the relationship migration 610; performing an automated relationship generation process to create the new relationship(s) 612; performing an automated transfer process to transfer all objects to the new relationship 614; and automatically causing a relationship termination process of the existing relationship(s) that are migrated 614.

According to embodiments herein, in the step of generating, for provision to the user, a first UI configured for identifying and providing access information regarding existing relationships (e.g., accounts) for potential migration to the first entity 604, the first UI may be configured to: (i) display one or more first UI elements that enable the user to specify the one or more existing relationships that the user may wish to migrate to the first entity, and (ii) provide one or more fields into which the user enters access information that enables direct electronic access, by the first entity, to objects (e.g., account information) representing the one or more existing relationships (e.g., accounts).

In some embodiments, in the step of generating, for provision to the user, a second UI 606, the second UI may be configured to: (i) display one or more relationship types and associated relationship information regarding the one or more existing relationships that the user may wish to migrate, and (ii) provide one or more second UI elements configured to allow the user to select at least one element representing the one or more existing relationships with respect to which the user desires to receive offer information regarding potential migration.

According to certain embodiments, in the step of generating, for provision to the user, a third UI 610, the third UI may be configured to: (i) display a comparison view illustrating the new relationship terms of the one or more new relationships compared against existing relationship terms of the one or more existing relationships that the user selected for potential migration, and (ii) provide one or more third UI elements selection of which by the user confirms that the user authorizes relationship migration to proceed for selected ones of the at least one element representing the one or more existing relationships selected for potential migration.

In some embodiments, the step of performing an automated relationship generation process to create the new relationship(s) 612 may comprise performing, upon receipt of the at least one element selected representing the one or more existing relationships, an automated relationship generation process that creates the one or more new relationship authorized via user-selection of the one or more third UI elements. According to some aspects, the step of performing an automated transfer process to transfer all objects to the new relationship 614 may comprise automatically performing a transfer process, by the at least one computer accessing at least one application programming interface (API) of at least one computer platform associated with the second entities, via an external network connection, including: (i) generating electronic requests to transfer all objects associated with a respective existing relationship to the first entity; (ii) associating the transferred objects with a respective new relationship associating with the second entity; and (iii) confirming that the transferred objects have been transferred.

In accordance with one particular illustrative implementation of the migration method 600 of FIG. 6, the one or more existing relationships may comprise one or more existing accounts (e.g., financial accounts, etc.), the one or more new relationships may comprise one or more new accounts, the one or more relationship types may comprise one or more account types (e.g., checking, savings, etc.), the relationship information may comprises new account information, the new relationship terms may comprise new account terms, the existing relationship terms may comprise existing account terms, the relationship migration may comprises account migration, the automated relationship generation process may comprise an automated account generation process, and the relationship termination process may comprise an account termination process. In some implementations, the new account terms compared against the existing account terms in the comparison view comprise one or more of a fee (e.g., monthly account fee, service fee, etc.), an interest rates, an account type, and one or more terms associated with each account being compared.

In another implementation related to such particular account migration innovations, the migration method 600 may further comprise: determining, via the direct electronic access of the one or more existing accounts by the at least one computer, at least one recurring transaction among a plurality of charges of the one or more existing accounts; and automatically initiating a transfer process related to transferring the at least one recurring transaction to at least one respective new account. Here, for example, in some embodiments, such transfer process may comprise one or both of: (i) displaying the at least one recurring transaction to the user with an interactive element that enables the user to migrate the at least one recurring transaction to the at least one respective new account; and (ii) automatically migrating the at least one recurring transaction to the at least one respective new account.

In still other implementations related to such particular account migration innovations, the at least one computer associated with providing the portal may automatically query, once the account access information is received, account types and account balances from the one or more existing accounts that the user selected for the potential migration. Similarly, with regard to such account migration innovations, one migration method 600 may further comprise generating, for provision to the user, another UI configured to: (i) display one or more UI elements configured to receive identifying information regarding the user; and (ii) confirm, upon submission of the identifying information, an actual identity of the user based on analysis of the identifying information. One example of a UI configured for receiving such user-identifying information is shown and described further below in connection with FIG. 7H.

According to other account migration innovations, as shown and described in connection with FIG. 7D below, the migration method 600 may further comprise providing, to the user: (i) a list of financial institutions from which migrations of accounts to the first entity are possible, and (ii) one or more interactive UI elements that enable the user to select at which of the financial institutions on the list the user has one or more existing accounts. Further, in some embodiments, the first UI may comprise: an initial screen (e.g., FIG. 7D) comprising a list of all of the second entities regarding which account migration to the first entity is supported, wherein selection of a second entity from the list automatically navigates the user to a second screen (e.g., FIG. 7E) having fields to receive login access credentials of the user for accessing the second entity online. The processing performed to establish candidate accounts for possible migration may also include utilization of the APIs 510 described above in connection with FIG. 5. Here, for example, the process of acquiring a list of user accounts that are available for migration to the first entity (referred to as an "account acquisition process") may be performed by an application programming interface (API) of at least one computer associated with the first entity. In some embodiments, such account acquisition process may include: (i) receiving a first list of at least one of the second entities at which at least one existing account of the user is held; (ii) determining at least one second entity, from the first list of at least one of the second entities, regarding which the first entity supports account migration; and (iii) presenting a second list of accounts that the user has at the at least one second entity such that accounts on the second list are displayed as selectable items, wherein selection of an account from the second list selects the account for the potential migration.

According to still other implementations, the migration method 600 may further comprise, as part of the confirming that the balances/funds have been transferred, generating a fifth UI, for transmission to the user, confirming that the one or more new accounts have been opened and that the balances have been transferred. One example of such fifth UI is shown and described further, below, in connection with FIG. 7K.

Finally, the at least one computer associated with the first entity may execute various different instructions in automatically initiating or automatically causing a relationship termination process of the existing relationship(s) that are migrated, at 616. In one embodiments, for example, the relationship or account deletion process may comprise automatically transmitting, by the one or more computers associated with the first entity, electronic communications to the second entities associated with the one or more existing accounts that were successfully migrated to the first entity, to close the one or more existing accounts that were successfully migrated. Further, according to certain other embodiments, the relationship or account termination process may be performed (1) automatically, e.g., by one or more computers associated with the first entity, (2) manually, e.g., by action of the user, or (3) via a process that includes by automated processing performed by computer as well as manual action or interaction of the user.

Many banks require accounts to be closed through specific channels, most commonly via a phone call, or an email exchange. While the overall process of closing an account is fairly simple, it is tiered such that each phase must ensure both sides of the conversation are in agreement to progress to the next stage. According to certain embodiments herein, the step of automatically causing a relationship or account termination process 616 may comprise various advancements in text-to-speech and natural language processing that enable the process to be more fully automated. In some embodiments, such innovations and feature may be implemented through the utilization of commercially available Cloud Machine Learning API's. In one aspect, for example, implementations could include, though not limited by, use of Google's Cloud Natural Language API. According to one specific example of such functionality, first, personal authentication information must be provided (e.g., first name, last name, security questions, account number, etc.). Then, when the handshake is completed and the user has been validated, the intention (e.g., terminate account) must be made clear. Finally, the last phase is the institution issuing a confirmation. The new advancements in sentiment analysis, entity analysis, content classification, and syntax analysis has greatly reduced the risk associated with commissioning an automated software application to handle conversational tasks with a clear objective. Accordingly, consistent with the above features, embodiments herein are able to transform the previously manual termination process, often requiring a phone call or email exchange, into an automated process. Such innovations provide systems and methods herein with additional capabilities for automating relationship or account termination or closure processes on behalf of the end user.

FIGS. 7A-7K are diagrams illustrating various exemplary user interfaces, features and functionality for performing migration of one or more relationships or accounts, consistent with exemplary aspects of certain embodiments of the present disclosure.

As discussed above, embodiments herein may include providing a portal and/or generating various user interfaces for performing migration of one or more relationships or accounts, from one or more existing entities, to a first entity or institution. FIG. 7A depicts an example of a login or sign-in screen 700 that may comprise a first field 702 for login credentials, a button 704 to sign in based on the credentials entered, and other related UI options, such as a toggle switch to remember the user, an option to recover or reset login is the user forgot their login information, and the like, as associated with known user login screens. In some embodiments, different login credentials may also be utilized to sign in, such as credentials associated with a related, known or trusted entity, user fingerprint, other biometric information, or the like. Once signed-in, the portal may present the user with a first screen 705, which may provide the user with various information 706 regarding the migration tool or process (e.g., 'What it is', 'How it works', etc.), Terms and Conditions for use of the migration tool 708, a button or selection 710 to confirm acceptance of the Terms and Conditions, and a button or option to proceed 712. FIG. 7C depicts an example of a user having selected the button to accept the Terms and Conditions, at 711, and the user selecting the continue button 712 to proceed, e.g., to the screen shown in FIG. 7D, once the information is reviewed and the Terms and Conditions accepted.

FIG. 7D depicts an example of a first screen 713 of an illustrative migration process, which provides functionality for the user to identify the institutions or banks where they have relationships and/or accounts, which the user may desire to migrate to the first entity. Referring to FIG. 7D, the first screen 713 may comprise: a search field 714, such as a search bar for entering a text search, enabling the user to search for the institution or bank where they have one or more existing relationships or accounts; a list of known and/or common banks 716, which may include a number of options that the user may select by simply clicking or selecting an entry corresponding to the institution where they have a relationship or account; and one or more additional options or tools 720 that provide functionality for the user to identify a desired institution of theirs, e.g., when they are unable to locate it by searching for it or selecting it, e.g., from the list of institutions provided at 716. The first screen 713 may also include a scroll bar or scrolling functionality 718, or similar UI mechanism, that enables the user to quickly scroll through a list of institutions or banks being offered as potential entities where the user has relationships or accounts. Once the user locates an institution, such as "The Bank" shown in the first screen 713, the user may select the institution name or a UI element corresponding to that institution, at 719. Upon such selection, the portal will proceed with providing one or more screens to identify the relationships or accounts at that institution for potential migration, e.g., beginning with FIG. 7E.

Figure 7F:
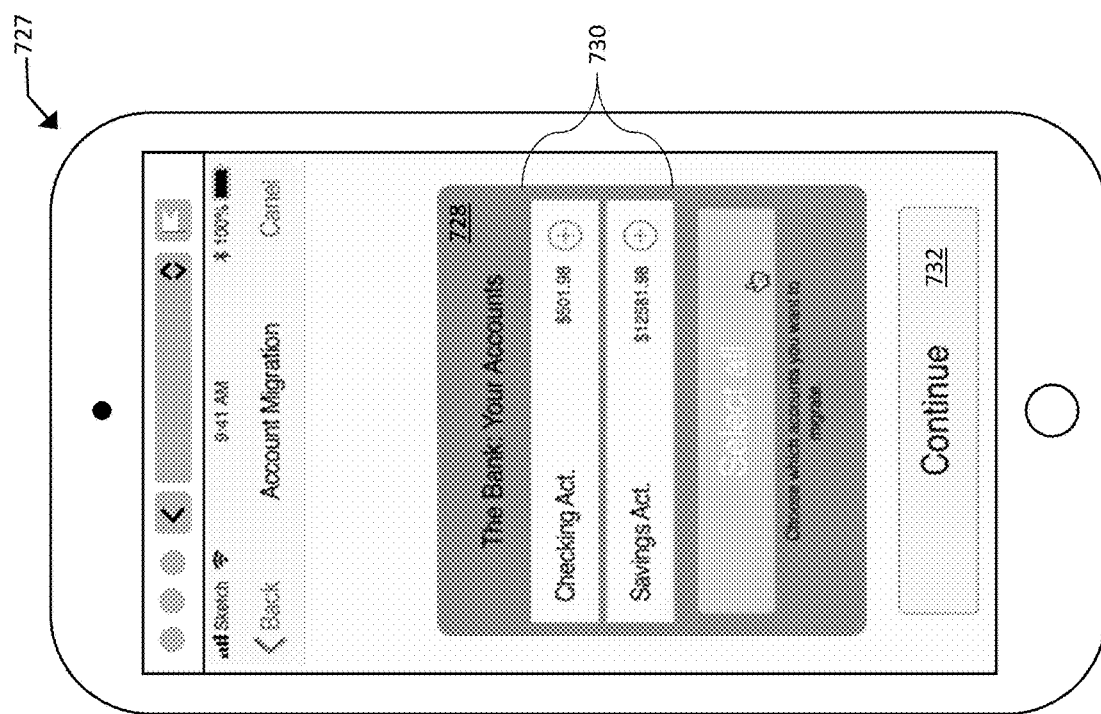
Figure 7E:
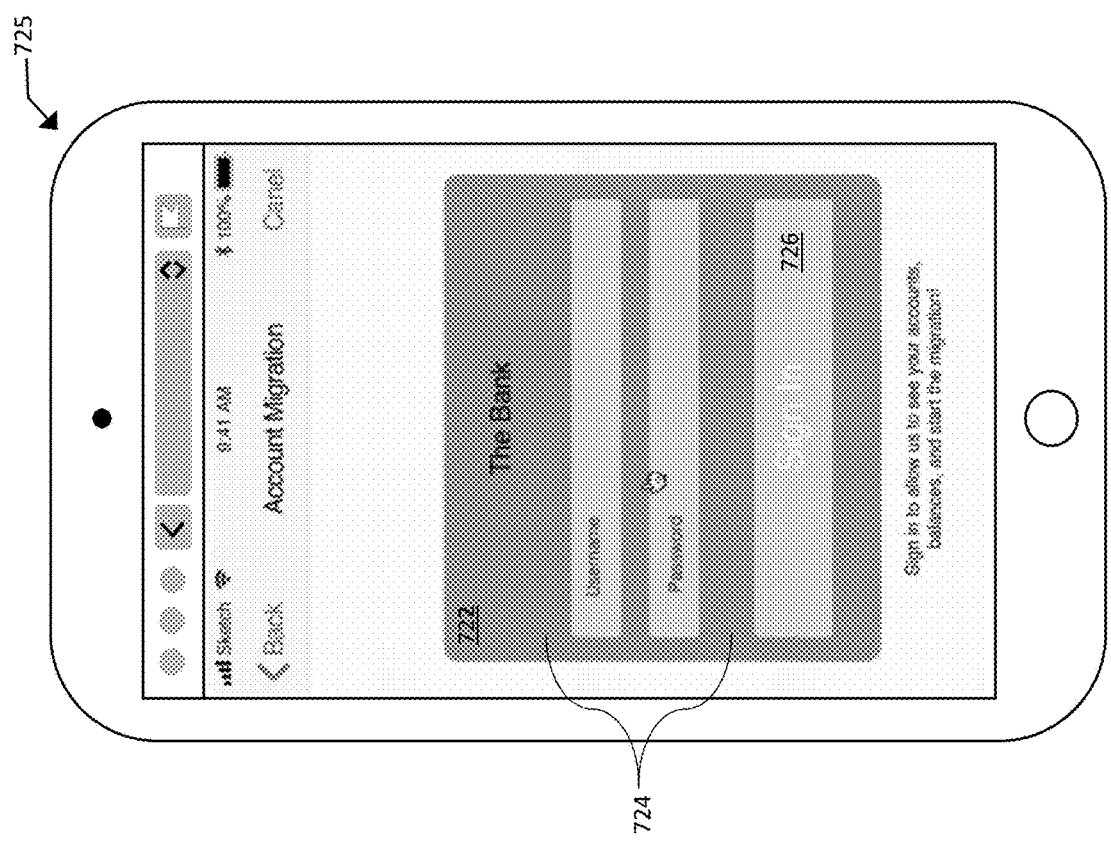

FIG. 7E depicts an example of a second screen 725 of an illustrative migration process, which provides functionality for the user to provide, within the portal of the first entity, the login information (e.g., username and password, etc.) utilized by the first entity to automatically login to the institution of the user selected in FIG. 7D. Here, for example, the portal may generate a login credentials field 722, including one or more fields 724 for the user to enter their login information and a sign in button or option 726 to proceed with login. Next, as shown in FIG. 7F, the portal may generate a third screen 727, which includes details of the user's relationships or accounts at the selected institution. Referring to the illustrative embodiment shown in FIG. 7F, for example, the exemplary third screen 727 may comprise a relationship or account summary field 728, which may include a listing 730 of the various relationships and/or accounts that the user has with that institution, as well as a button or option to 'select all' relationships or accounts. In some embodiments, the relationships or accounts may be selectable by the user (e.g., by touching or clicking the account name) and/or may include a button or other UI element that enables the user to select each relationship or account for further processing. FIG. 7G illustrates the results of such user interaction to select the relationships or accounts for possible migration, according to one embodiment, indicating the accounts that were selected by displaying checkmarks 736 at the right of each relationship or account entry on the list. The exemplary third screen 727 of FIGS. 7F and 7G may also include another button or option 732 to continue with the migration processing, e.g., once the desired relationships or accounts have been selected by the user.

Figure 7H:
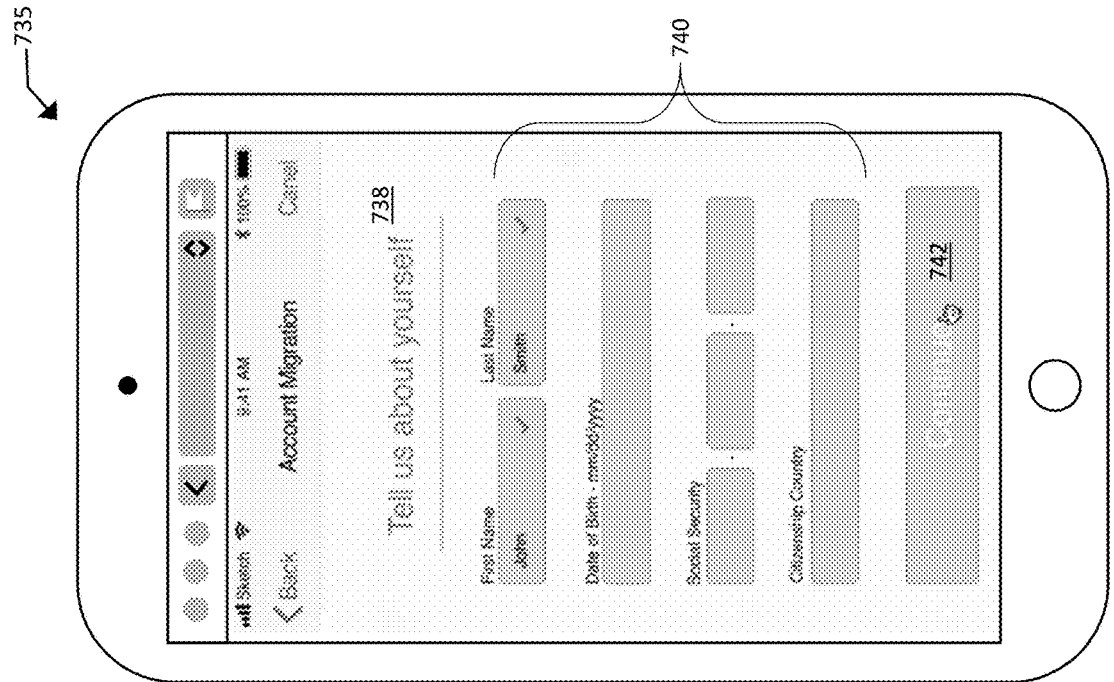
Figure 7G:
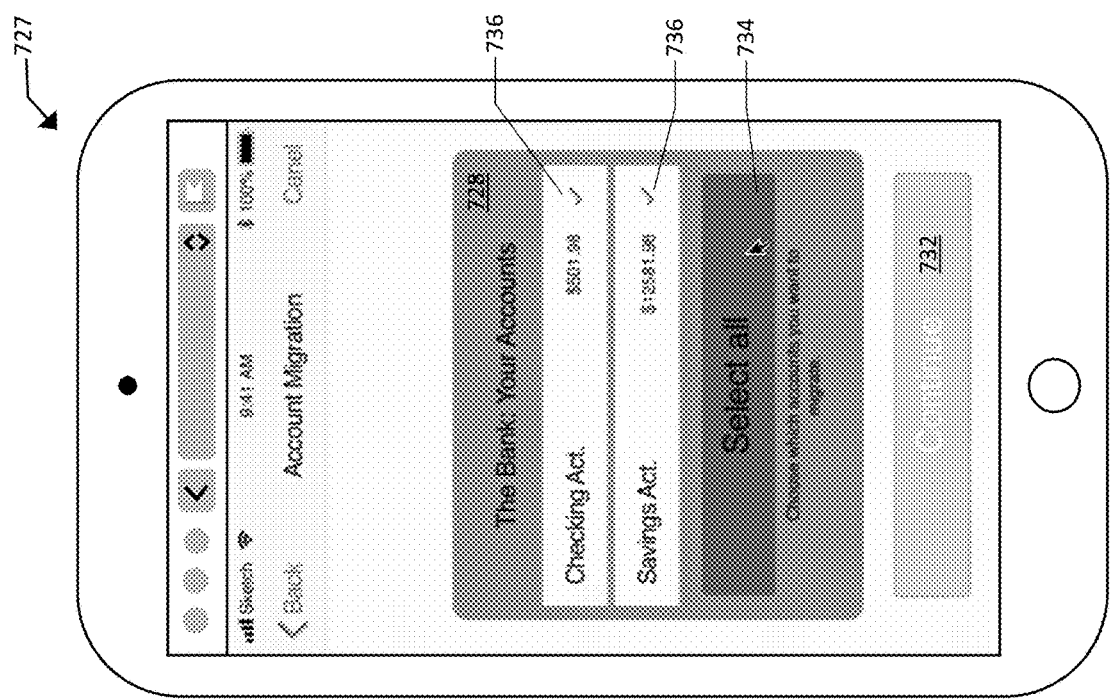

FIG. 7H depicts an example of a fourth screen 735 of an illustrative migration process, which provides functionality for the user to enter and submit their identifying information, such as confidential user information that may be needed to transfer a relationship or account from one financial institution to another. Referring to FIG. 7H, an exemplary fourth screen 735 may be utilized by the portal to collect important personal information regarding the user that's required to migrate the relationships or accounts to the first entity. The fourth screen 735 may comprise an information entry interface 738 as well as a continue button 742 used to proceed with the migration process once the information is entered. The information entry interface 738 may comprise a plurality of data fields for completion by the user. According to the one illustrative embodiment shown in FIG. 7H, for example, the data fields may include name (which may be pre-populated), date of birth, social security number, and country of citizenship. Different or additional fields may be used or needed according to various embodiments.

Figure 7J:
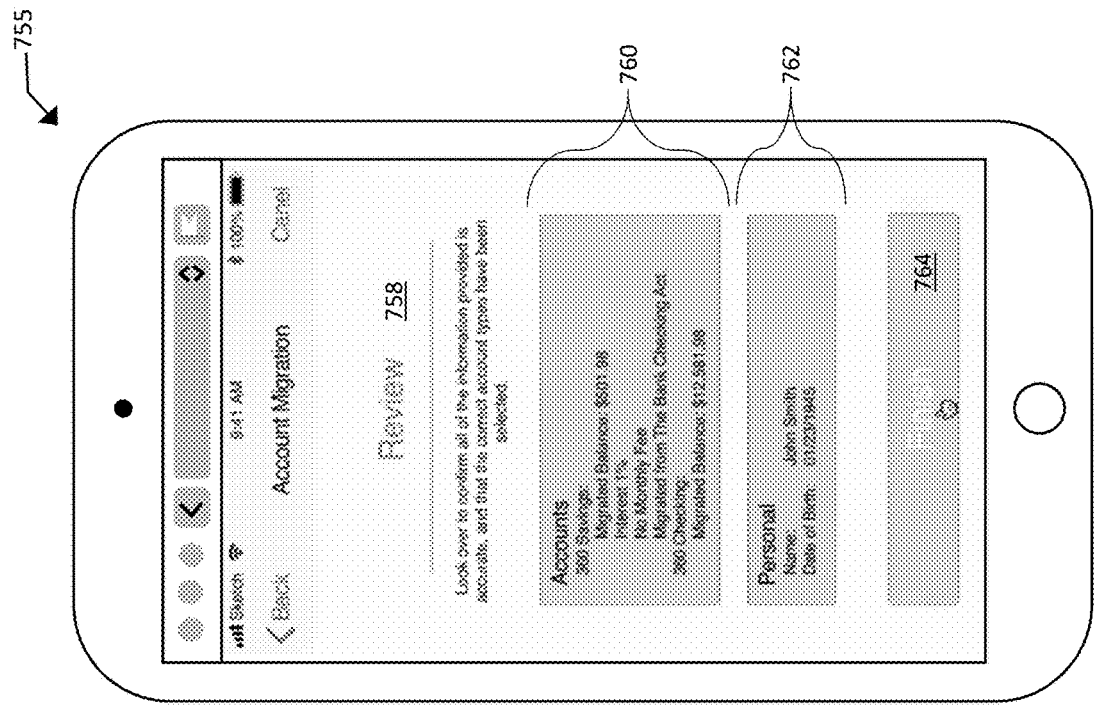
Figure 7I:
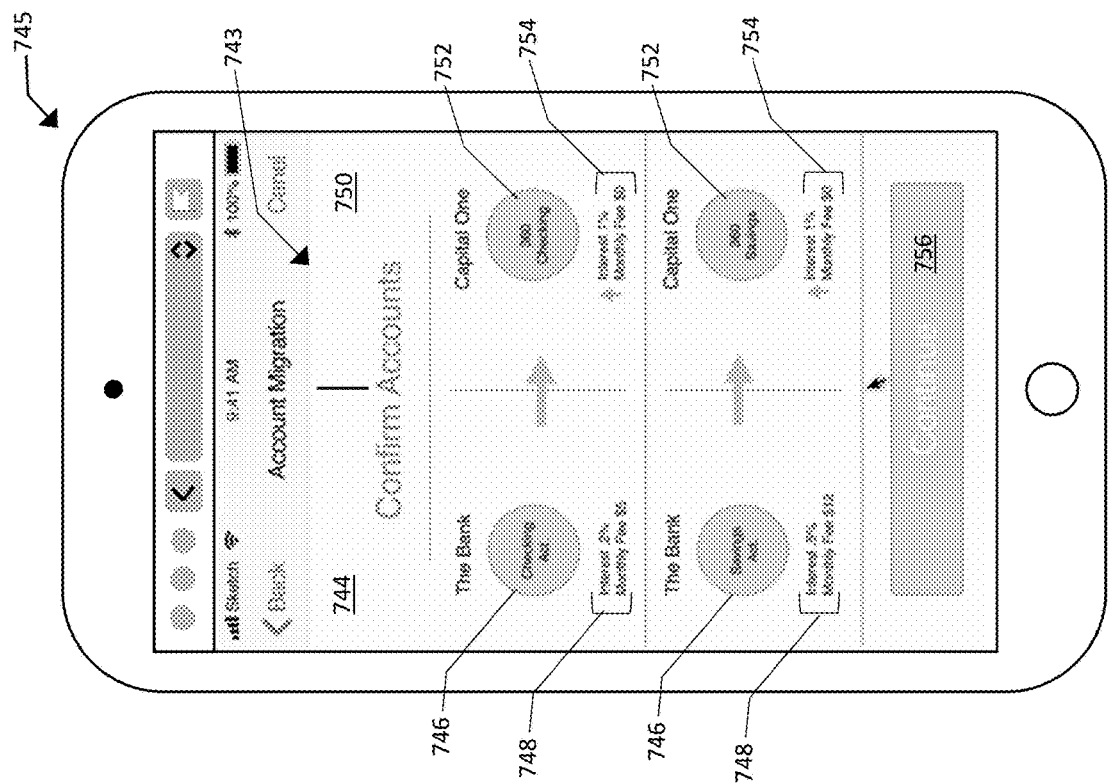
Figure 7K:
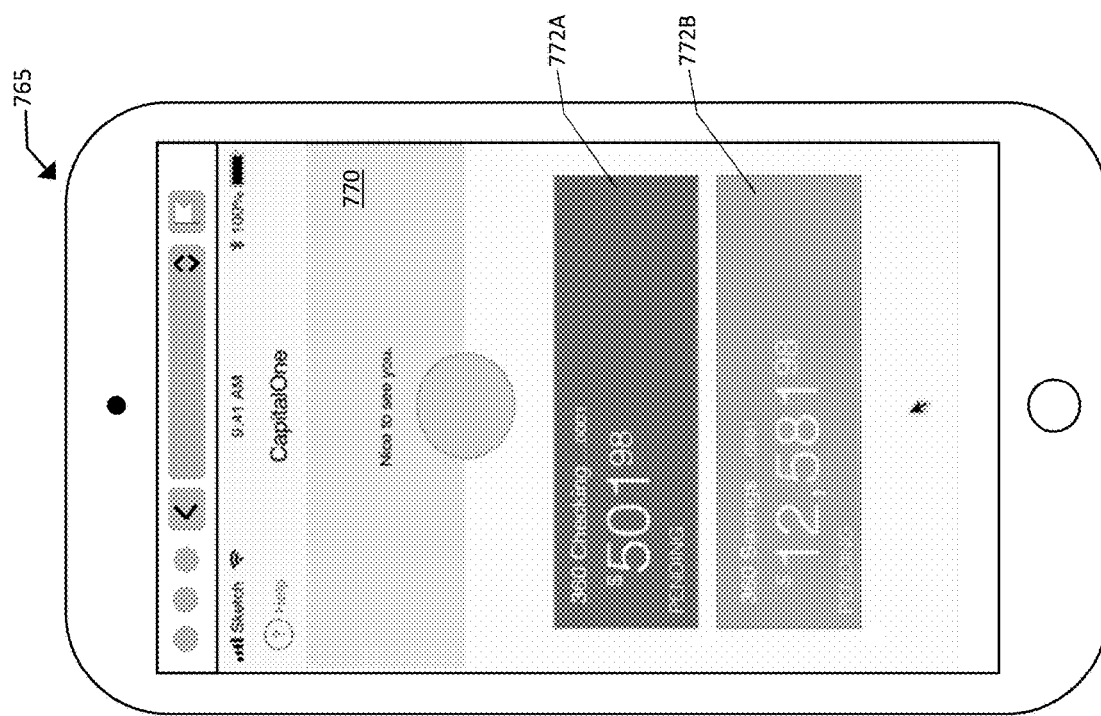

Once the user information is submitted via the fourth screen 735 and the information/user authenticated via one or more computer systems associated with the first entity, the portal may generate a fifth screen 745, an example of which is illustrated in FIG. 7I. In one embodiment shown in FIG. 7I, the portal may generate, as the fifth screen 745, a relationship or account comparison and confirmation interface. Referring to FIG. 7I, an example fifth screen 745 may comprise a comparison field 743 divided into two halves 744, 750 as well as a continue button 756 or like UI element used to proceed to the next screen. The comparison field 743 may comprise a first half 744 for displaying a list of all the existing relationships or accounts being proposed for migration as well as a second half 750 for displaying the list of the new relationships or accounts being offered as replacements. Each entry of the existing relationships or accounts as well as the replacement relationships or accounts may comprise comparative information including graphical indicia 746 and/or alpha-numeric information 748. The alpha-numeric information 748 may comprise various terms and conditions regarding the relationship or account, such as interest rate, monthly fee, and/or other data points suitable for comparison. Once the user has assessed this comparative information provided via the fifth screen 745 and indicated to continue 756, the portal will generate a sixth screen 755 for the user to review and confirm acceptance of the migration, as set forth in connection with FIG. 7J.

FIG. 7J depicts an example of a sixth screen 755 of an illustrative migration process, enabling the user to review a summary of the proposed migration and associated information and select whether or not they wish to accept the proposed migration according to the terms generated and displayed to them via the portal. In the exemplary embodiment shown in FIG. 7J, the sixth screen 755 may comprise a review pane 758 and a finish button 764 or like UI element to proceed if the user agrees to the migration. In some embodiments, the review pane 758 may include a new relationship or account summary field 760 and a user information field 762. The new relationship or account summary field 760 is used to provide a summary of terms regarding the relationship or accounts being offered as well as a list of assets, such as bank balance(s), being transferred from the existing entity to the new entity via the migration. The user information field 762 is used to provide a summary of the information regarding the user, e.g., to again help confirm that the migration is being performed for and authorized by the correct individual.

Upon agreeing with the relationship/account migration being offered, the user selects the finish button 764 and proceeds to a seventh screen 765 that displays confirmation or results of the migration. In the exemplary embodiment shown in FIG. 7K, the seventh screen 765 may comprise a confirmation pane 770 that includes a summary of the new relationships or accounts that have been created to replace the old accounts migrated to the first entity. The summary of new relationships or accounts may comprise, for example, display fields 722A,722B that display textual summaries of the new relationships or accounts created.

Figure 8:
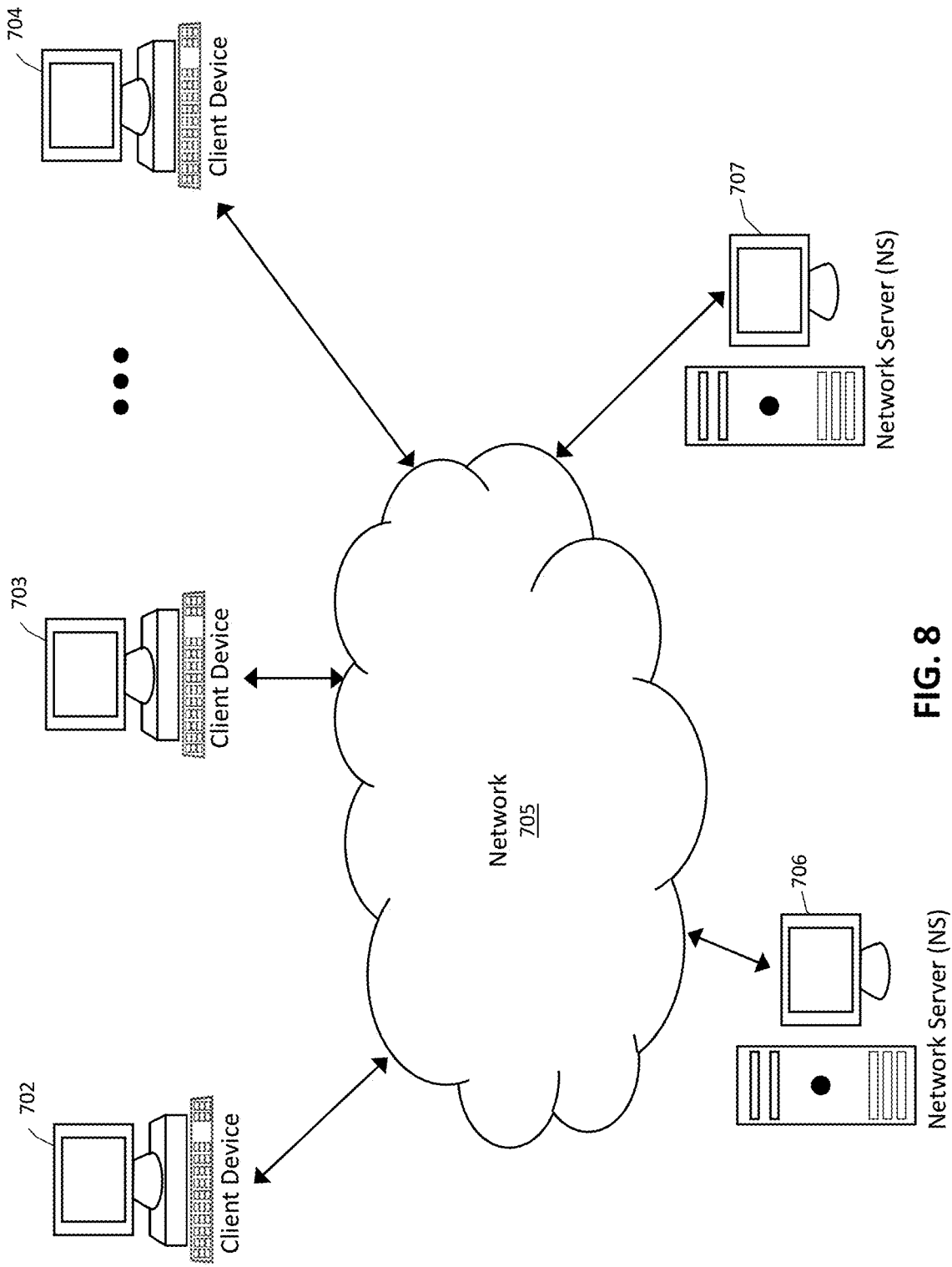
FIG. 8 is a block diagram depicting an exemplary computer-based system and/or platform, in accordance with certain embodiments of the present disclosure.

FIG. 8 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of members (e.g., clients, and their users) and/or concurrent interactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 8, members 702-704 (e.g., clients) of the exemplary computer-based system/platform may include virtually any computing device capable of receiving and sending a message over a network (e.g., organization intranet, cloud network, etc.), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include may run one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed network/web browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 8, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 9:
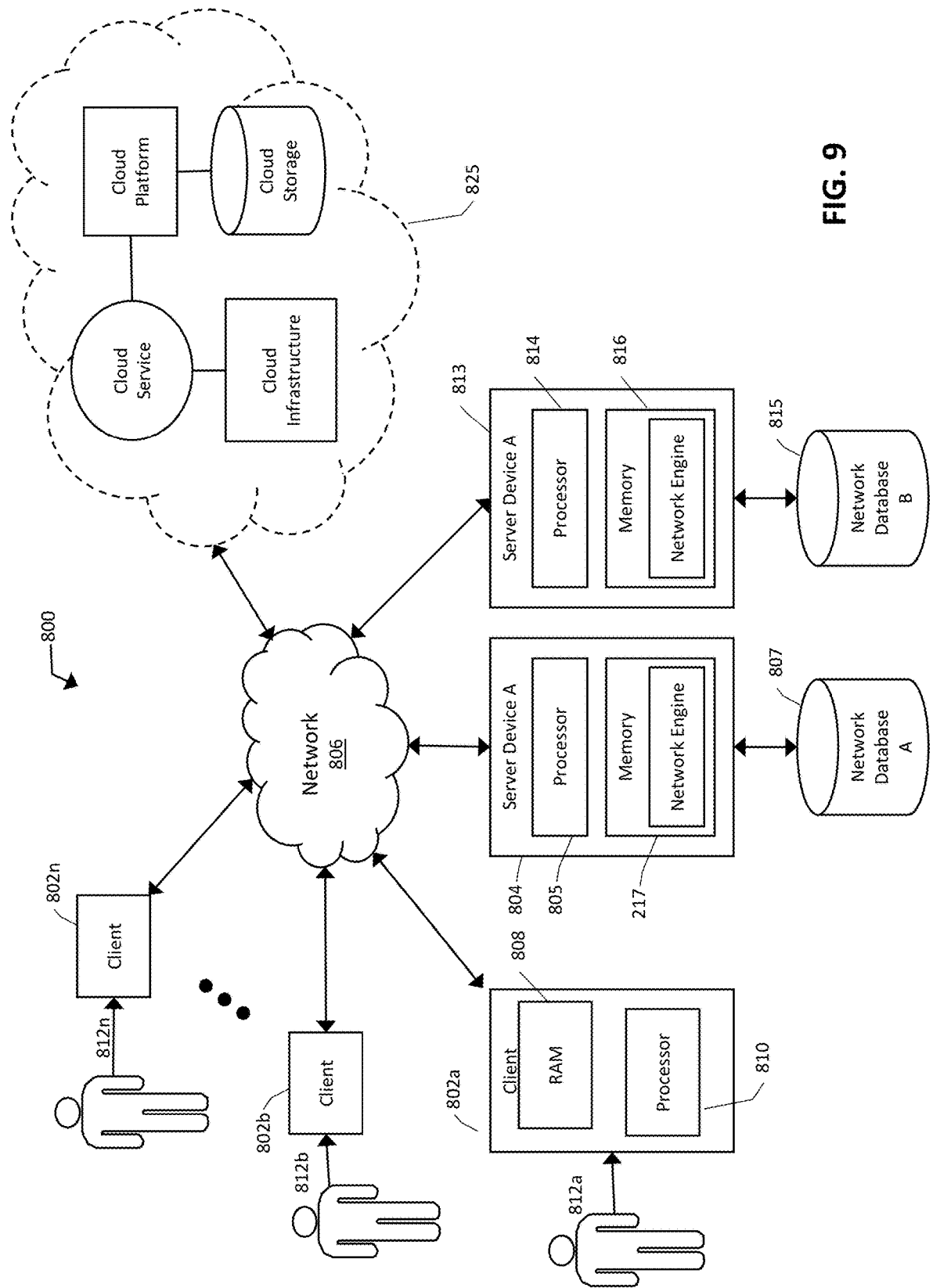
FIG. 9 is a block diagram depicting another exemplary computer-based system and/or platform, in accordance with certain embodiments of the present disclosure.

FIG. 9 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 802a, 802b thru 802n shown each at least includes a computer-readable medium, such as a random-access memory (RAM) 808 coupled to a processor 810 or FLASH memory. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a-n may also comprise a number of external or internal devices such as a mouse, a CD-ROM, DVD, a physical or virtual keyboard, a display, or other input or output devices. In some embodiments, examples of member computing devices 802a-n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a-n may be specifically programmed with one or more application programs in accordance with one or more principles/methodologies detailed herein. In some embodiments, member computing devices 802a-n may operate on any operating system capable of supporting a browser or browser-enabled application, such as Microsoft™, Windows™, and/or Linux. In some embodiments, member computing devices 802a-n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a-n, users, 812a-n, may communicate over the exemplary network 806 with each other and/or with other systems and/or devices coupled to the network 806. As shown in FIG. 9, exemplary server devices 804 and 813 may be also coupled to the network 806. In some embodiments, one or more member computing devices 802a-n may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 10:
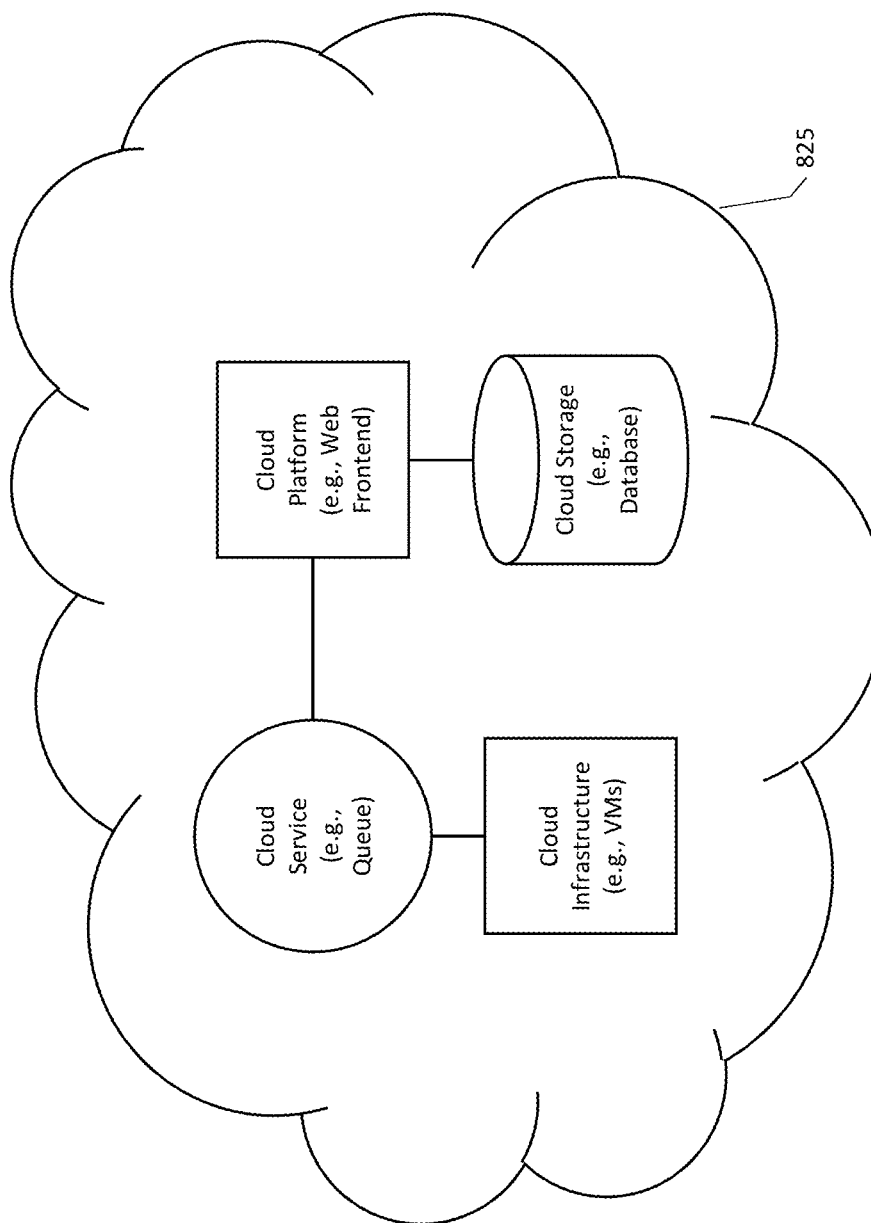
FIGS. 10 and 11 are diagrams illustrating two exemplary implementations of cloud computing architecture/aspects with respect to which the disclosed technology may be specifically configured to operate, in accordance with certain embodiments of the present disclosure.

As also shown in FIGS. 9 and 10, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

Figure 11:
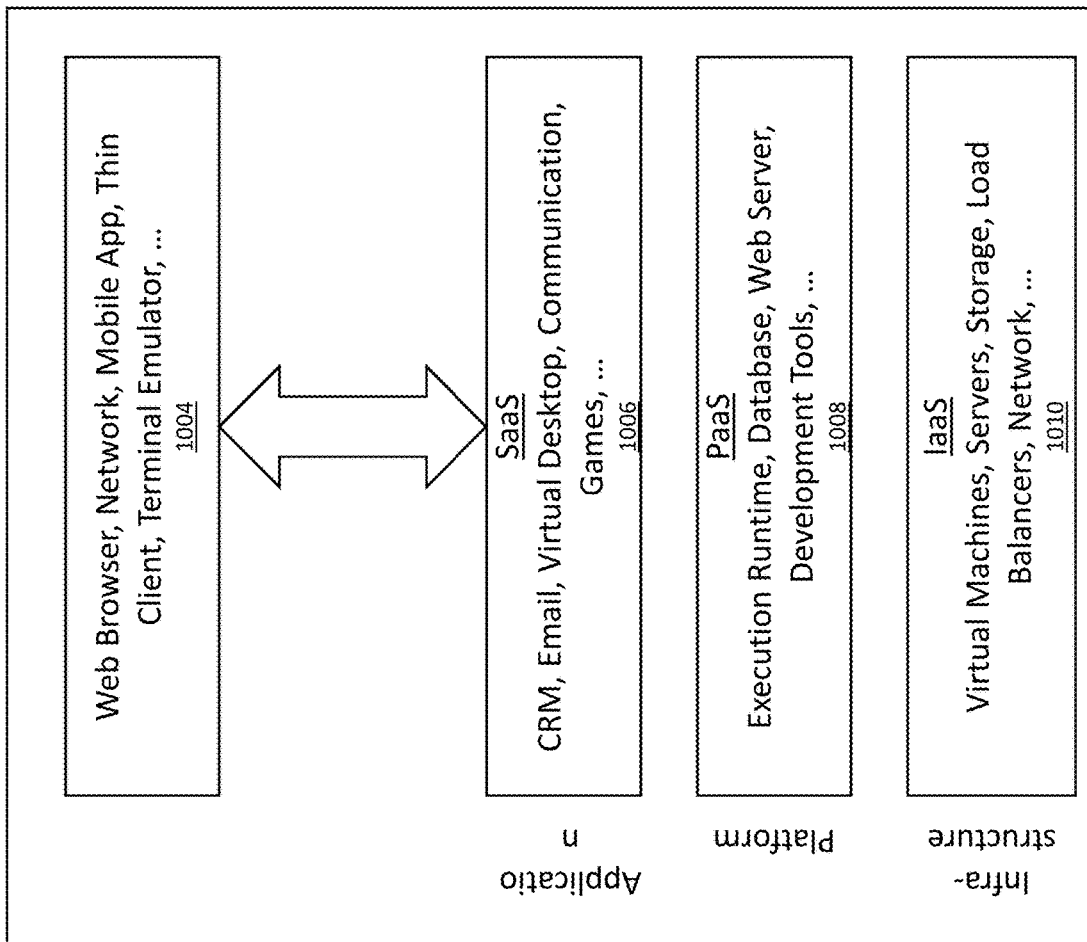

According to some embodiments shown by way of one example in FIG. 11, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS)

1006. FIGS. 10 and 11 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the web browser and network aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 3-4) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A computer-implemented method comprising:
  providing, by at least one computer associated with a first entity, a portal by which a user may be provided functionality to migrate, to the first entity, one or more existing relationships that the user has with one or more second entities;
  generating, by the at least one computer, for provision to the user, a first UI configured to:
    (i) display one or more first UI elements that enable the user to specify the one or more existing relationships that the user may wish to migrate to the first entity, and
    (ii) provide one or more fields into which the user enters access information that enables direct electronic access, by the first entity, to objects representing the one or more existing relationships;
  generating, by the at least one computer, for provision to the user, a second UI configured to:
    (i) display one or more relationship types and associated relationship information regarding the one or more existing relationships that the user may wish to migrate, and
    (ii) provide one or more second UI elements configured to allow the user to select at least one element representing the one or more existing relationships with respect to which the user desires to receive offer information regarding potential migration;
  determining by the at least one computer, new relationship terms of one or more new relationships that the first entity can offer the user, the one or more new relationships corresponding to the one or more existing relationships that the user selected for the potential migration to the first entity;
  generating, by the at least one computer, for provision to the user, a third UI configured to:
    (i) display a comparison view illustrating the new relationship terms of the one or more new relationships compared against existing relationship terms of the one or more existing relationships that the user selected for potential migration, and
    (ii) provide one or more third UI elements selection of which by the user confirms that the user authorizes relationship migration to proceed for selected ones of the at least one element representing the one or more existing relationships selected for potential migration;
  upon receipt of the at least one element selected representing the one or more existing relationships, performing, by the at least one computer, an automated relationship generation process that creates the one or more new relationship authorized via user-selection of the one or more third UI elements; and
  automatically performing a transfer process, by the at least one computer accessing at least one application programming interface (API) of at least one computer platform associated with the second entities, via an external network connection, including:
    (i) generating electronic requests to transfer all objects associated with a respective existing relationship to the first entity;
    (ii) associating the transferred objects with a respective new relationship associating with the second entity; and
    (iii) confirming that the transferred objects have been transferred; and automatically causing, by the at least one computer, a relationship termination process of the one or more existing relationship to terminate each respective transferred existing relationship with the second entity that was successfully transferred to the first entity.

Clause 2. The method of clause 1 or the innovations of any clause herein, wherein the one or more existing relationships comprise one or more existing accounts, the one or more new relationships comprise one or more new accounts, the one or more relationship types comprise one or more account types, the relationship information comprises account information, the new relationship terms comprise new account terms, the existing relationship terms comprise existing account terms, the relationship migration comprises account migration, the automated relationship generation process comprises an automated account generation process, and the relationship termination process comprises an account termination process.

Clause 3. The method of clause 2 or the innovations of any clause herein, wherein the new account terms compared against the existing account terms in the comparison view comprise one or more of a fee, an interest rates, an account type, and one or more terms associated with each account being compared.

Clause 4. The method of clause 3 or the innovation of any clause herein, further comprising:
determining, via the direct electronic access of the one or more existing accounts by the at least one computer, at least one recurring transaction among a plurality of charges of the one or more existing accounts; and
automatically initiating a transfer process related to transferring the at least one recurring transaction to at least one respective new account, the transfer process comprising one or both of: (i) displaying the at least one recurring transaction to the user with an interactive element that enables the user to migrate the at least one recurring transaction to the at least one respective new account; and (ii) automatically migrating the at least one recurring transaction to the at least one respective new account.

Clause 5. The method of clause 2 or the innovation of any clause herein, wherein the at least one computer automatically queries, once the account access information is received, account types and account balances from the one or more existing accounts that the user selected for the potential migration.

Clause 6. The method of clause 2 or the innovation of any clause herein, further comprising:
generating, for provision to the user, another UI configured to: (i) display one or more UI elements configured to receive identifying information regarding the user; and (ii) confirm, upon submission of the identifying information, an actual identity of the user based on analysis of the identifying information.

Clause 7. The method of clause 2 or the innovation of any clause herein, further comprising:
providing, to the user: (i) a list of financial institutions from which migrations of accounts to the first entity are possible, and (ii) one or more interactive UI elements that enable the user to select at which of the financial institutions on the list the user has one or more existing accounts.

Clause 8. The method of clause 2 or the innovation of any clause herein, wherein the first UI comprises:
an initial screen comprising a list of all of the second entities regarding which account migration to the first entity is supported, wherein selection of a second entity from the list automatically navigates the user to a second screen having fields to receive login access credentials of the user for accessing the second entity online.

Clause 9. The method of clause 2 or the innovation of any clause herein, further comprising, as part of the confirming that the balances/funds have been transferred:
generating a fifth UI, for transmission to the user, confirming that the one or more new accounts have been opened and that the balances have been transferred.

Clause 10. The method of clause 1 or the innovation of any clause herein, further comprising:
performing an account acquisition process, by an application programming interface (API) of at least one first computer associated with the first entity, including:
(i) receiving a first list of at least one of the second entities at which at least one existing account of the user is held;
(ii) determining at least one second entity, from the first list of at least one of the second entities, regarding which the first entity supports account migration; and
(iii) presenting a second list of accounts that the user has at the at least one second entity such that accounts on the second list are displayed as selectable items, wherein selection of an account from the second list selects the account for the potential migration.

Clause 11. The method of clause 2 or the innovation of any clause herein, wherein the account deletion process comprises:
automatically transmitting, by the one or more computers associated with the first entity, electronic communications to the second entities associated with the one or more existing accounts that were successfully migrated to the first entity, to close the one or more existing accounts that were successfully migrated.

Clause 12. The method of clause 2 or the innovation of any clause herein, wherein the account termination process is performed by one or both of: automatically, by one or more computers associated with the first entity, and manually, by the user.

Clause 13. A computer-implemented method comprising:
providing, by at least one computer associated with a first entity, a portal by which a user may be provided functionality to migrate, to the first entity, one or more existing accounts that the user has at one or more second entities;
generating, by the at least one computer, for provision to the user, a first UI configured to:
(i) display one or more first UI elements that enable the user to specify the one or more existing accounts that the user may wish to migrate to the first entity, and
(ii) provide one or more fields into which the user enters account access information that enables direct electronic access, by the first entity, to the one or more existing accounts;
wherein the at least one computer automatically queries, once the account access information is received, account types and account balances from the one or more existing accounts that the user selected for the potential migration;
generating, by the at least one computer, for provision to the user, a second UI configured to:
(i) display one or more account types and associated account information including the account balances regarding the one or more existing accounts that the user may wish to migrate, and
(ii) provide one or more second UI elements configured to allow the user to select the one or more existing accounts with respect to which the user desires to receive offer information regarding potential migration;
determining by the at least one computer, new account terms of one or more new accounts that the first entity can offer the user, the one or more new accounts corresponding to the one or more existing accounts that the user selected for the potential migration to the first entity;
generating, by the at least one computer, for provision to the user, a third UI configured to:
(i) display a comparison view illustrating the new account terms of the one or more new accounts compared against existing account terms of the one or more existing accounts that the user selected for potential migration, and (ii) provide one or more third UI elements selection of which by the user confirms that the user authorizes account migration to proceed for selected ones of the one or more existing accounts selected for potential migration;

upon receipt of the selected ones of the one or more existing accounts, performing, by the at least one computer, an automated account generation process that creates the one or more new accounts authorized via user-selection of the one or more third UI elements; and automatically performing a transfer process, by the at least one computer accessing at least one application programming interface (API) of at least one computer platform associated with the second entities, via an external network connection, including:
(i) generating electronic requests to transfer all balances to the first entity;
(ii) depositing the balances into the one or more new accounts created at the first entity; and
(iii) confirming that the balances have been transferred; and automatically executing, by the at least one computer, an account termination process of the one or more existing accounts to terminate each respective transferred existing account that was successfully transferred to the first entity.

Clause 14. The method of clause 13 or the innovation of any clause herein, wherein the new account terms compared against the existing account terms in the comparison view comprise one or more of a fee, an interest rates, an account type, and one or more terms associated with each account being compared.

Clause 15. The method of clause 14 or the innovation of any clause herein, further comprising:
determining, via the direct electronic access of the one or more existing accounts by the at least one computer, at least one recurring transaction among a plurality of charges of the one or more existing accounts; and
automatically initiating a transfer process related to transferring the at least one recurring transaction to at least one respective new account, the transfer process comprising one or both of: (i) displaying the at least one recurring transaction to the user with an interactive element that enables the user to migrate the at least one recurring transaction to the at least one respective new account; and (ii) automatically migrating the at least one recurring transaction to the at least one respective new account.

Clause 16. The method of clause 13 or the innovation of any clause herein, further comprising:
generating, for provision to the user, another UI configured to: (i) display one or more UI elements configured to receive identifying information regarding the user; and (ii) confirm, upon submission of the identifying information, an actual identity of the user based on analysis of the identifying information.

Clause 17. The method of clause 13 or the innovation of any clause herein, further comprising:
providing, to the user: (i) a list of financial institutions from which migrations of accounts to the first entity are possible, and (ii) one or more interactive UI elements that enable the user to select at which of the financial institutions on the list the user has one or more existing accounts.

Clause 18. The method of clause 13 or the innovation of any clause herein, wherein the first UI comprises:
an initial screen comprising a list of all of the second entities regarding which account migration to the first entity is supported, wherein selection of a second entity from the list automatically navigates the user to a second screen having fields to receive login access credentials of the user for accessing the second entity online.

Clause 19. The method of clause 13 or the innovation of any clause herein, further comprising, as part of the confirming that the balances/funds have been transferred:
generating a fifth UI, for transmission to the user, confirming that the one or more new accounts have been opened and that the balances have been transferred.

Clause 20. The method of clause 13 or the innovation of any clause herein, further comprising:
performing an account acquisition process, by an application programming interface (API) of at least one first computer associated with the first entity, including:
(i) receiving a first list of at least one of the second entities at which at least one existing account of the user is held;
(ii) determining at least one second entity, from the first list of at least one of the second entities, regarding which the first entity supports account migration; and
(iii) presenting a second list of accounts that the user has at the at least one second entity such that accounts on the second list are displayed as selectable items, wherein selection of an account from the second list selects the account for the potential migration.

Clause 21. The method of clause 13 or the innovation of any clause herein, wherein the account deletion process comprises:
automatically transmitting, by the one or more computers associated with the first entity, electronic communications to the second entities associated with the one or more existing accounts that were successfully migrated to the first entity, to close the one or more existing accounts that were successfully migrated.

Clause 22. The method of clause 13 or the innovation of any clause herein, wherein the account termination process is performed by one or both of: automatically, by one or more computers associated with the first entity, and manually, by the user.

Clause 20. Embodiments herein may also take the form of a system comprised of computing elements that are arranged, programmed and/or otherwise adapted to perform the features and functionality set forth anywhere above.

Clause 21. In addition, embodiments herein may also take the form of one or more computer readable media containing computer-executable instructions for performing any of the processing herein, the computer-executable instructions being executable via one or more processing components to process instructions and/or perform one or more aspects of the functionality set forth herein.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method comprising:
receiving, by at least one first computer directly associated with a first entity via a portal, from a computing device associated with a user, user account access information for at least one current user account so as to enable the at least one first computer to establish a direct electronic access to digital objects associated with the at least one current user account via at least one second computer associated with one or more second entities, the digital objects representing the at least one current user account and one or more existing electronic relationships associated with the at least one current user account within the at least one second computer;
automatically establishing, by the at least one first computer directly associated with the first entity, a direct communication between the at least one first computer directly associated with the first entity and the at least one second computer associated with the one or more second entities to access to the digital objects based on the current user account access information and implemented via one or more inter-entity application programming interfaces (APIs) of the at least one second computer associated with the one or more second entities, the inter-entity APIs being configured for communication between the first entity and the one or more second entities;
determining, by the at least one first computer directly associated with the first entity, from the digital objects at the at least one second computer, account information of the at least one current user account and the one or more existing relationships associated with the at least one current user account;
generating, by the at least one first computer, a first UI, and providing the first UI, via a network, to the computing device associated with the user, the first UI being configured to allow the user to issue an automatic electronic account migration instruction of the at least one current user account and comprising one or more UI elements configured to allow the user to define one or more account-related migration parameters and/or select the one or more existing relationships that the user desires to be migrated with the at least one current user account;
processing, by the at least one first computer directly associated with the first entity via the portal, from the computing device associated with the user, the automatic electronic account migration instruction to migrate the at least one current user account from the at least one second computer associated with one or more second entities;
automatically generating, by the at least one first computer, a second UI, and providing the second UI to the computing device associated with the user, the second UI comprising one or both of: (i) information associated with one or more relationship types and/or the associated relationship information regarding the one or more existing relationships that the user wishes to migrate, or (ii) new account data of the at least one new user account and/or one or more new relationships at the at least one first computer;
automatically determining by the at least one first computer, one or more new relationship terms of the one or more new relationships that the first entity offers to the user, wherein the one or more new relationships correspond to at least one migrating candidate;
generating, by the at least one first computer, a third UI, and providing the third UI to the computing device associated with the user, wherein the third UI comprises:
(i) a comparison view illustrating the at least one new relationship terms of the one or more new relationships compared against at least one existing relationship terms of the at least one migrating candidate relationship, and
(ii) one or more third UI elements selection of which by the user confirms that the user authorizes relationship migration to proceed for selected ones of the at least one element representing the at least one migrating candidate relationship selected;
automatically instructing, by the at least one first computer directly associated with the first entity, over the network, based on the automatic electronic account migration instruction, the at least one second computer to perform a transfer process, via an external network connection;
automatically establishing, by the at least one first computer directly associated with the first entity, at least one electronic record of at least one new user account and one or more new relationships associated with that at least one new user account at the at least one first computer based on transferred content of the at least one current user account and the relationship data for the one or more existing relationships.

2. The method of claim 1, wherein the one or more existing relationships comprise one or more existing accounts, the one or more new relationships comprise one or more new accounts, the one or more relationship types comprise one or more account types, the relationship information comprises account information, the new relationship terms comprise new account terms, and/or the existing relationship terms comprise existing account terms, the relationship migration comprises account migration.

3. The method of claim 1, wherein the new relationship terms comprise new account terms and the existing relationship terms comprise existing account terms, wherein the new account terms compared against the existing account terms in the comparison view comprise one or more of a fee, an interest rates, an account type, and one or more terms associated with each account being compared.

4. The method of claim 1, further comprising:
determining, via the direct electronic access of the one or more existing accounts via accessing the inter-entity APIs by the at least one first computer, at least one recurring transaction among a plurality of charges of the one or more existing accounts; and
automatically initiating a transfer process related to transferring the at least one recurring transaction to at least one respective new account, the transfer process comprising one or both of: (i) displaying the at least one recurring transaction to the user with an interactive element that enables the user to migrate the at least one recurring transaction to the at least one respective new account; and (ii) automatically migrating the at least one recurring transaction to the at least one respective new account.

5. The method of claim 1, wherein the one or more relationship types and the associated relationship information are returned by the inter-entity APIs and displayed, via the portal provided by the first entity, for direct visual comparison with one or more new relationship terms of one or more new relationships that the first entity offers to the user.

6. The method of claim 1, further comprising:
generating, for provision to the user, another UI configured to: (i) display one or more UI elements configured to receive identifying information regarding the user; and (ii) confirm, upon submission of the identifying information, an actual identity of the user based on analysis of the identifying information.

7. The method of claim 1, further comprising:
providing, to the user: (i) a list of financial institutions from which migrations of accounts to the first entity are possible, and (ii) one or more interactive UI elements that enable the user to select at which of the financial institutions on the list the user has one or more existing accounts.

8. The method of claim 1, wherein the first UI comprises:
an initial screen comprising a list of all of the second entities regarding which account migration to the first entity is supported, wherein selection of a second entity from the list automatically navigates the user to a second screen having fields to receive login access credentials of the user for accessing the second entity online.

9. The method of claim 1, further comprising:
confirming that the transferred objects have been transferred, including generating a fifth UI, for transmission to the user, confirming that the one or more new accounts have been opened and that the objects have been transferred.

10. The method of claim 1, further comprising:
performing an account acquisition process, by an application programming interface (API) associated with the at least one first computer associated with the first entity, including:
(i) receiving a first list of at least one of the second entities at which at least one existing account of the user is held;
(ii) determining at least one second entity, from the first list of at least one of the second entities, regarding which the first entity supports account migration; and
(iii) presenting a second list of accounts that the user has at the at least one second entity such that accounts on the second list are displayed as selectable items, wherein selection of an account from the second list selects the account for the potential migration.

11. The method of claim 1, further comprising:
performing an account deletion process including automatically transmitting, by the one or more computers associated with the first entity, electronic communications to the second entities associated with the one or more existing accounts that were successfully migrated to the first entity, to close the one or more existing accounts that were successfully migrated.

12. The method of claim 1, further comprising:
performing an account termination process that is performed automatically, by one or more computers associated with the first entity.

13. One or more non-transitory computer-readable media storing instructions that, when executed by at least one processor, cause the at least one processor to perform operations comprising:
processing, by at least one first computer directly associated with a first entity via a portal, from a computing device associated with a user, user account access information received for at least one current user account so as to enable the at least one first computer to establish a direct electronic access to digital objects associated with the at least one current user account via at least one second computer associated with one or more second entities, the digital objects representing the at least one current user account and one or more existing electronic relationships associated with the at least one current user account within the at least one second computer;
automatically establishing, by the at least one first computer directly associated with the first entity, a direct communication between the at least one first computer directly associated with the first entity and the at least one second computer associated with the one or more second entities to access to the digital objects based on the current user account access information and implemented via one or more inter-entity application programming interfaces (APIs) of the at least one second computer associated with the one or more second entities, the inter-entity APIs being configured for communication between the first entity and the one or more second entities;
determining, by the at least one first computer directly associated with the first entity, from the digital objects at the at least one second computer, account information of the at least one current user account and the one or more existing relationships associated with the at least one current user account;
generating, by the at least one first computer, a first UI, and providing the first UI, via a network, to the computing device associated with the user, the first UI being configured to allow the user to issue an automatic electronic account migration instruction of the at least one current user account and comprising one or more UI elements configured to allow the user to define one or more account-related migration parameters and/or select the one or more existing relationships that the user desires to be migrated with the at least one current user account;
processing, by the at least one first computer directly associated with the first entity via the portal, from the computing device associated with the user, the automatic electronic account migration instruction to migrate the at least one current user account from the at least one second computer associated with one or more second entities;
automatically generating, by the at least one first computer, a second UI, and providing the second UI to the computing device associated with the user, the second UI comprising one or both of: (i) information associated with one or more relationship types and/or the associated relationship information regarding the one or more existing relationships that the user wishes to migrate, or (ii) new account data of the at least one new user account and/or one or more new relationships at the at least one first computer;

automatically determining by the at least one first computer, one or more new relationship terms of the one or more new relationships that the first entity offers to the user, wherein the one or more new relationships correspond to at least one migrating candidate;

generating, by the at least one first computer, a third UI, and providing the third UI to the computing device associated with the user, wherein the third UI comprises:
(i) a comparison view illustrating the at least one new relationship terms of the one or more new relationships compared against at least one existing relationship terms of the at least one migrating candidate relationship, and
(ii) one or more third UI elements selection of which by the user confirms that the user authorizes relationship migration to proceed for selected ones of the at least one element representing the at least one migrating candidate relationship selected;

automatically instructing, by the at least one first computer directly associated with the first entity, over the network, based on the automatic electronic account migration instruction, the at least one second computer to perform a transfer process, via an external network connection;

automatically establishing, by the at least one first computer directly associated with the first entity, at least one electronic record of at least one new user account and one or more new relationships associated with that at least one new user account at the at least one first computer based on transferred content of the at least one current user account and the relationship data for the one or more existing relationships.

14. The computer-readable media of claim 13, wherein the new account terms compared against the existing account terms in the comparison view comprise one or more of a fee, an interest rates, an account type, and one or more terms associated with each account being compared.

15. The computer-readable media of claim 13, the operations further comprising:
determining, via the direct electronic access of the one or more existing accounts via accessing the inter-entity APIs by the at least one first computer, at least one recurring transaction among a plurality of charges of the one or more existing accounts; and
automatically initiating a transfer process related to transferring the at least one recurring transaction to at least one respective new account, the transfer process comprising one or both of: (i) displaying the at least one recurring transaction to the user with an interactive element that enables the user to migrate the at least one recurring transaction to the at least one respective new account; and (ii) automatically migrating the at least one recurring transaction to the at least one respective new account.

16. The computer-readable media of claim 13, the operations further comprising:
generating, for provision to the user, another UI configured to: (i) display one or more UI elements configured to receive identifying information regarding the user; and (ii) confirm, upon submission of the identifying information, an actual identity of the user based on analysis of the identifying information.

17. The computer-readable media of claim 13, the operations further comprising:
providing, to the user: (i) a list of financial institutions from which migrations of accounts to the first entity are possible, and (ii) one or more interactive UI elements that enable the user to select at which of the financial institutions on the list the user has one or more existing accounts.

18. The computer-readable media of claim 13, wherein the first UI comprises:
an initial screen comprising a list of all of the second entities regarding which account migration to the first entity is supported, wherein selection of a second entity from the list automatically navigates the user to a second screen having fields to receive login access credentials of the user for accessing the second entity online.

19. The computer-readable media of claim 13, the operations further comprising:
confirming that the digital objects have been transferred, including generating a fifth UI, for transmission to the user, confirming that the one or more new accounts have been opened and that the digital objects have been transferred.

20. A system comprising:
one or more computers associated with a first entity; and
one or more non-transitory computer-readable media storing instructions that, when executed by at least one processor associated with or coupled to the one or more computers, cause the at least one processor to perform operations comprising:
processing, by at least one first computer directly associated with a first entity via a portal, from a computing device associated with a user, user account access information received for at least one current user account so as to enable the at least one first computer to establish a direct electronic access to digital objects associated with the at least one current user account via at least one second computer associated with one or more second entities, the digital objects representing the at least one current user account and one or more existing electronic relationships associated with the at least one current user account within the at least one second computer;
automatically establishing, by the at least one first computer directly associated with the first entity, a direct communication between the at least one first computer directly associated with the first entity and the at least one second computer associated with the one or more second entities to access to the digital objects based on the current user account access information and implemented via one or more inter-entity application programming interfaces (APIs) of the at least one second computer associated with the one or more second entities, the inter-entity APIs being configured for communication between the first entity and the one or more second entities;
determining, by the at least one first computer directly associated with the first entity, from the digital objects at the at least one second computer, account information of the at least one current user account and the one or more existing relationships associated with the at least one current user account;
generating, by the at least one first computer, a first UI, and providing the first UI, via a network, to the computing device associated with the user, the first UI being configured to allow the user to issue an automatic electronic account migration instruction of the at least one current user account and comprising one or more UI elements configured to allow the user to define one or more account-related migration parameters and/or select the one or more existing relationships that the user desires to be migrated with the at least one current user account;

processing, by the at least one first computer directly associated with the first entity via the portal, from the computing device associated with the user, the automatic electronic account migration instruction to migrate the at least one current user account from the at least one second computer associated with one or more second entities;

automatically generating, by the at least one first computer, a second UI, and providing the second UI to the computing device associated with the user, the second UI comprising one or both of: (i) information associated with one or more relationship types and/or the associated relationship information regarding the one or more existing relationships that the user wishes to migrate, or (ii) new account data of the at least one new user account and/or one or more new relationships at the at least one first computer;

automatically determining by the at least one first computer, one or more new relationship terms of the one or more new relationships that the first entity offers to the user, wherein the one or more new relationships correspond to at least one migrating candidate;

generating, by the at least one first computer, a third UI, and providing the third UI to the computing device associated with the user, wherein the third UI comprises one or both of:
(i) a comparison view illustrating the at least one new relationship terms of the one or more new relationships compared against at least one existing relationship terms of the at least one migrating candidate relationship, and/or
(ii) one or more third UI elements selection of which by the user confirms that the user authorizes relationship migration to proceed for selected ones of the at least one element representing the at least one migrating candidate relationship selected;

automatically instructing, by the at least one first computer directly associated with the first entity, over the network, based on the automatic electronic account migration instruction, the at least one second computer to perform a transfer process, via an external network connection;

automatically establishing, by the at least one first computer directly associated with the first entity, at least one electronic record of at least one new user account and one or more new relationships associated with that at least one new user account at the at least one first computer based on transferred content of the at least one current user account and the relationship data for the one or more existing relationships.

* * * * *